(12) United States Patent
Laidlaw et al.

(10) Patent No.: US 9,807,109 B2
(45) Date of Patent: *Oct. 31, 2017

(54) PROFILING CYBER THREATS DETECTED IN A TARGET ENVIRONMENT AND AUTOMATICALLY GENERATING ONE OR MORE RULE BASES FOR AN EXPERT SYSTEM USABLE TO PROFILE CYBER THREATS DETECTED IN A TARGET ENVIRONMENT

(71) Applicant: CYBERLYTIC LIMITED, London (GB)

(72) Inventors: Stuart Laidlaw, Hants (GB); St. John Harold, West Ealing (GB); Mark Hillick, Dublin (IE)

(73) Assignee: CYBERLYTIC LIMITED, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/337,120

(22) Filed: Oct. 28, 2016

(65) Prior Publication Data
US 2017/0085588 A1   Mar. 23, 2017

Related U.S. Application Data

(63) Continuation of application No. 14/562,541, filed on Dec. 5, 2014, now Pat. No. 9,503,472.

(30) Foreign Application Priority Data

Dec. 6, 2013   (GB) .................................. 1321565.2

(51) Int. Cl.
G06F 11/00 (2006.01)
H04L 29/06 (2006.01)
(Continued)

(52) U.S. Cl.
CPC ........ H04L 63/1433 (2013.01); G06F 21/552 (2013.01); G06F 21/577 (2013.01);
(Continued)

(58) Field of Classification Search
CPC ............. H04L 63/1416; H04L 63/1425; H04L 63/1433; H04L 63/1441; H04L 63/145;
(Continued)

(56) References Cited

U.S. PATENT DOCUMENTS 7,594,270 B2 * 9/2009 Church ................. G06F 21/552
  726/23
7,634,809 B1 * 12/2009 Schneider ........... H04L 63/1416
  726/22
(Continued)

Primary Examiner — Hosuk Song
(74) Attorney, Agent, or Firm — Cowan, Liebowitz & Latman, P.C.; Steven D. Underwood

(57) ABSTRACT

A computer implemented method of profiling cyber threats detected in a target environment, comprising: receiving, from a Security Information and Event Manager (SIEM) monitoring the target environment, alerts triggered by a detected potential cyber threat, and, for each alert: retrieving captured packet data related to the alert; extracting data pertaining to a set of attributes from captured packet data triggering the alert; applying fuzzy logic to data pertaining to one or more of the attributes to determine values for one or more output variables indicative of a level of an aspect of risk attributable to the cyber threat.

9 Claims, 11 Drawing Sheets

(51) Int. Cl.
*G06F 21/55* (2013.01)
*G06N 5/04* (2006.01)
*G06F 21/57* (2013.01)
*G06N 7/02* (2006.01)

(52) U.S. Cl.
CPC ............ *G06N 5/048* (2013.01); *G06N 7/023* (2013.01); *H04L 63/1425* (2013.01); *H04L 63/1466* (2013.01)

(58) Field of Classification Search
CPC ............ H04L 63/1475; H04L 63/1483; H04L 63/1491; H04L 41/06; H04L 41/0604; G06F 21/577
USPC ............... 726/22–25; 713/150; 709/223–225
See application file for complete search history.

(56) References Cited

U.S. PATENT DOCUMENTS

| | | | | |
|---|---|---|---|---|
| 8,040,798 B2* | 10/2011 | Chandra | ............. | H04L 12/2602 370/229 |
| 8,418,247 B2* | 4/2013 | Sinnaya | ............. | H04L 63/1416 726/22 |
| 8,438,241 B2* | 5/2013 | Bar | .................... | H04L 63/0236 709/218 |
| 9,503,472 B2* | 11/2016 | Laidlaw | ................ | G06F 21/552 |
| 2004/0250124 A1* | 12/2004 | Chesla | ................. | G06F 21/552 726/13 |

\* cited by examiner

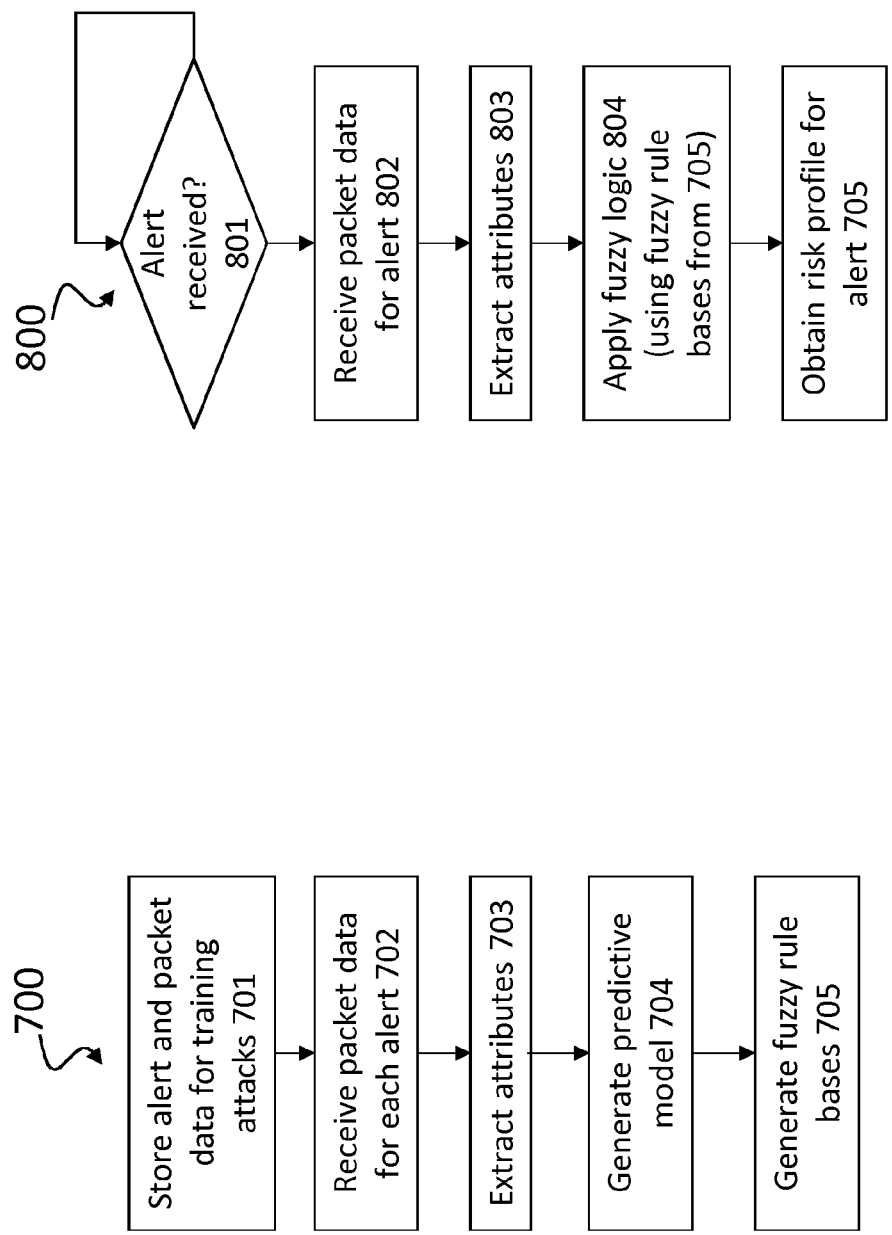

PROFILING CYBER THREATS DETECTED IN A TARGET ENVIRONMENT AND AUTOMATICALLY GENERATING ONE OR MORE RULE BASES FOR AN EXPERT SYSTEM USABLE TO PROFILE CYBER THREATS DETECTED IN A TARGET ENVIRONMENT

CROSS-REFERENCE TO RELATED APPLICATIONS

This application is a continuation of U.S. patent application Ser. No. 14/562,541, filed Dec. 5, 2014. The entire contents of that application are incorporated herein by reference.

FIELD OF THE TECHNOLOGY

The subject matter set out in this application relates generally to the security of computing apparatus and computer networks. More specifically, the present application discloses computer implemented methods, computer apparatus and computer program products for profiling cyber threats detected in a target computing environment. In addition, the present invention also discloses computer implemented methods, computer apparatus and computer program products for automatically generating one or more rule bases for an expert system usable to profile cyber threats detected in a target environment.

BACKGROUND

The ubiquity of modern day computing apparatus and their connectedness to one or more networks and to the Internet can render the computing apparatus, networks, data stored and programs operated thereby vulnerable to attack by malicious agents—known as "hackers"—trying to gain access to and control of the resources made available by these connected computing environments.

Attempts at malicious attacks on a computer system or network—known as "cyber threats"—can take the form of many different attack vectors. Successful attacks can result in one or more of the key characteristics of a secure computer system: confidentiality, system integrity and resource availability; being compromised. Common attack vectors for achieving access to or control of resources of a computer system include malware such as malicious libraries, viruses, worms, Trojans, malicious active content and denial of service attacks; OS command injection attacks; buffer overflow attacks; cross-site scripting attacks (XSS); phishing attacks, and SQL injection attacks (SQLi). All of these attacks operate by exploiting weaknesses in the security of specific computer systems. Cyber threats generally are increasing in their frequency with a typical organisation trying to operate a secure computer system now facing a multitude of threats within the cyber sphere.

Specific computing environments made available securely over a network will attract specific threat sources and actors with attack vectors that are continually evolving and becoming more sophisticated. Further, specific secure computing environments will have different security weaknesses whether or not they are easily discoverable and so will be susceptible to being compromised by different kinds and variants of cyber attack vector.

Cyber threats wanting to compromise computer resources are therefore now wide ranging in their origin, arising from hostile foreign intelligence services, terrorists, hackers, hacktivists, civilian personnel or a combination of any of the aforementioned groups. Such malicious agents are becoming increasingly well-resourced and skilled at discovering and exploiting weaknesses in secure computing systems so as to gain illicit access to the computing resources, access to which is provided thereby.

For example, the Common Weakness Enumeration (http://cwe.mitre.org/top25/index.html)—a list compiled in 2011 of the top 25 most dangerous programming "errors" exploited by hackers in mounting cyber threats compiled by SANS Institute and the Mitre Corporation—indicates that SQL injection attacks present the greatest danger to cyber security. Further, referring to FIG. 1 it can be seen from FIG. 4 of the IBM Corporation's X-force Mid Year Trend and Risk Report 2012 (http://www.03.ibm.com/security/xforce/downloads.html) that the rate of SQL injection attacks in the cyber sphere is steadily increasing.

Therefore, a significant challenge facing developers and administrators of secure computer environments is to continually evolve defences to cyber threats in order to detect and avert successful attacks. Various countermeasures are known to improve the security of computers and computer networks such as the use of firewalls, malware monitoring, antivirus software, and "secure" connections, protocols and encryption. However, malicious agents are nevertheless still able to illicitly gain access to the resources made available by computers and computer networks by circumventing these countermeasures and/or exploiting weaknesses in the target computing environments implemented thereby.

In order to police access to computer resources, and to help avert cyber attacks, monitoring of network traffic in order to detect cyber threats is of crucial importance. In this respect, secured computer environments are often provided with one or more security components such as those countermeasures identified above embodied in software, middleware, hardware and/or virtual hardware which together make up elements of a Security Information and Event Manager (SIEM) and/or feed data thereto. SIEM technology provides real-time analysis of security alerts generated by network hardware and applications. SIEM is provided as software, a hardware appliance or a managed service. It is also used to log security data and generate reports for compliance purposes. A SIEM provides an administrator of a secure computing environment with the capabilities of gathering, analysing and presenting information from network and security devices; vulnerability management; operating system, database and application logs; and external threat data. An example SIEM software suite currently available on the market is ArcSight, by the Hewlett-Packard Company of Palo Alto, Calif.

One way in which an SIEM provides information to system administrators about cyber threats is by way of alerts. On detection of a potential cyber threat by a security monitoring element of the computing environment, such as a Network Security Monitor (NSM), the SIEM issues an alert to the system administrator in real time by way of a dashboard interface of an Intrusion Detection System (IDS) (or optionally by email) to notify the system administrator of immediate potential security issues. On receipt of the alerts, the SIEM or other network security components may provide some degree of functionality allowing the system administrator to drill down into the data captured on the network, such as by a packet capture or sniffing software suite, to investigate the detected cyber threat further, and, potentially, intervene to prevent the cyber threat from successfully attacking and gaining access to the resources provided by the computer environment, for example by blocking packets from the IP address of the attacker.

A practical example of the alerts that can be collected in real-time use by an SIEM from SQL injection attacks detected by a network security monitor and presented in a dashboard is shown in FIG. 2. In even relatively modest size secure computing systems, the rate of generation of alerts that can be triggered by detections of potential cyber threats can outpace the rate at which system administrator teams can follow up on alerts and deal with them accordingly. The effectiveness of the security effort is therefore inherently limited by the quality of the data presented to the SIEM user in the dashboard, which is typically sparse including at most a brief indication of the reason for the alert being triggered, without any further meaning being provided within the data. It is therefore up to the administrators themselves to investigate further—or not—each cyber threat to evaluate the risk involved.

The security effort is often in practice incapable of effectively policing the system security due to data overload and as a result the secure computing environment can often be left vulnerable and compromised by attackers exploiting the weaknesses of the computing environment despite the system administrator's best attempts to utilise security monitoring and countermeasures.

It would therefore be desirable to provide a mechanism to facilitate the administrators of secure computing environments in effectively policing access to computer resources.

SUMMARY OF THE INVENTION

Viewed from a first aspect, the present invention provides a computer implemented method of profiling cyber threats detected in a target environment, comprising:
receiving, from an SIEM monitoring the target environment, alerts triggered by a detected potential cyber threat, and, for each alert:
  A. retrieving captured packet data related to the alert;
  B. extracting data pertaining to a set of attributes from captured packet data triggering the alert;
  C. applying fuzzy logic to data pertaining to one or more of the attributes to determine values for one or more output variables indicative of a level of an aspect of risk attributable to the cyber threat (hereinafter "CT risks").

The present inventors have realised that by evaluating an effective indicator of one or more aspects of risk attributable to a detected cyber threat, an SIEM can more effectively present system administrators with meaningful information about detected cyber threats. For example, by the present invention, alerts relating to detected cyber threats that are identified by the invention to be likely to be false positives and so indicated with a low risk measure, can be easily recognised by system administrators and discarded without requiring further detailed investigation. On the other hand, in the event that an alert is detected and is determined by the present invention to originate from a capable attacker and to present a sophisticated attack vector, a high risk measure is indicated for that alert allowing the system administrator to prioritise further investigation and prompt averting of the attack.

As will be understood from reading the present disclosure, the use of a fuzzy logic-based expert system to determine the level of indicators for one or more aspects of threat risk has been found to be particularly effective at evaluating threat risk indicators in real time. In operation, the claimed invention extracts attribute data from captured packets, fuzzifies it, and reasons over an expert rule base using a fuzzy inference engine. The expert rule base is developed so as to identify attribute values—or associations between the values of pleural attributes—that are symptomatic of certain aspects of threat risk. Once the output threat indicators from the fuzzy logic are defuzzified, the risk rating that is produced by the fuzzy logic provides a quick and accurate estimate of the relative risk posed by the cyber threat.

The present invention can be easily adapted to effectively evaluate the risk presented by different cyber threats in different target environments by adapting the fuzzy logic accordingly to identify accurate risk ratings for different types of attack vectors for different target environments.

Thus advantages that may be provided by embodiments of the present invention include:
  Enables security teams to prioritise and focus on high risk (e.g. high capability risk/high sophistication risk) attacks;
  Threat assessment improves decision making of system administrators and reduces data deluge—allowing attacks to be prioritised and treated accordingly;
  Decision response time is reduced by enabling security teams to focus their effort on responding to sophisticated/high capability attacks.

In embodiments, the method may further comprise ranking the received alerts in priority based on the respective cyber threat (CT) risks they represent.

In embodiments, the method may be performed in real-time to facilitate administrators in identifying high-risk cyber threats.

In embodiments, the alerts may be triggered by a network security monitor indicating a potential SQL injection attack.

In embodiments, the fuzzy logic may comprise one or more rule bases comprising fuzzy rules and being usable to evaluate a CT risk indicator.

In embodiments, each fuzzy rule of a rule base has: as an antecedent, a fuzzy set of one or more input fuzzy variables each representative of a said attribute and any logical operators connecting input fuzzy variables; and as a consequent, a fuzzy set of an output fuzzy variable representative of the CT risk indicator.

In embodiments, the step C) comprises, for each fuzzy rule of a rule base:
  i. for each input fuzzy variable of the antecedent, fuzzifying data pertaining to the attribute represented by the input fuzzy variable to determine a membership value across the fuzzy set of the input fuzzy variable;
  ii. evaluating the antecedent, performing any declared fuzzy logical operators to provide a single membership value; and
  iii. evaluating the consequent by performing a fuzzy implication operator on the antecedent to determine the membership value of the relevant output cyber threat indicator.

In embodiments, the step C.i comprises converting the threat attribute to a crisp value in the universe of discourse and applying the membership function for the relevant fuzzy set.

In embodiments, the method further comprises, for each rule base, aggregating the membership values output by each rule to produce a combined membership value for the CT risk indicator output by the rule base.

In embodiments, the method further comprises evaluating a compound CT risk indicator output fuzzy variable by combining membership values for the CT risk indicators output by plural rule bases using a further rule base to produce a membership value for a compound output CT risk indicator.

In embodiments, the method further comprises defuzzifying the membership values for each CT risk indicator output by the fuzzy logic to provide a crisp CT risk indicator value.

In embodiments, the or each rule base may have been produced automatically by performing the steps of:
  for each alert of a training set of alerts triggered by a potential cyber threat detected by an SIEM:
    retrieving captured packet data related to the alert; and
    extracting training threat data pertaining to a set of attributes from captured packet data triggering the alert;
  generating a predictive model of the level of risk posed by an alert based on attribute values for that alert by analysing the captured training threat data pertaining to the set of attributes; and
  generating a set of fuzzy rules based on the predictive model;

In embodiments, the method further comprises actually performing the steps of automatically producing the or each rule base.

In embodiments, the capturing of training threat data is performed in a test environment, preferably modelled on the target environment, such as to have similar weaknesses as the target environment.

In embodiments, generating a predictive model of the level of risk posed by an alert comprises using a machine learning algorithm to analyse the captured training threat data pertaining to the set of attributes.

In embodiments, the machine learning and fuzzy rule generation includes one or more of the following techniques:
  unsupervised learning;
  supervised learning;
  association rule learning;
  statistical classification;
  decision tree learning;
  clustering analysis.

In embodiments, generating a set of fuzzy rules based on the predictive model comprises analysing the predictive model to identify a fuzzy rule antecedent using one or more linguistic attribute values indicative of a cluster of training set cyber threats and an associated consequent output fuzzy variable value indicative of the CT risk posed by the cluster of training set cyber threats to the target environment.

In embodiments, the CT risk posed by the cluster of training set cyber threats to the target environment is assessed by monitoring what the effect of those cyber threats would be on the target environment, in view of the security vulnerabilities thereof.

In embodiments, the predictive model and the assessed CT risk posed by the cluster of training set cyber threats to the target environment are used to generate membership functions for the fuzzy sets of the input and/or output fuzzy variables and/or to generate crisp value conversion functions for non-numeric input attribute values.

In embodiments, the different rule bases are produced by grouping together related attributes and generating predictive models and/or rules based on only attributes in a group.

In embodiments, the grouping of attributes comprises performing feature selection on the attributes.

In embodiments, the detected cyber threats are one or more threats selected from the group comprising: SQL injection attacks; OS command injection attacks; buffer overflow attacks; XSS attacks; phishing attacks.

In embodiments, the fuzzy logic is configured to provide one or more output variables that are indicative of a level of the following aspects of risk attributable to the cyber threat: sophistication risk; capability risk; confidentiality risk; system integrity risk; system availability risk.

Viewed from a second aspect, the present invention provides a method of automatically generating one or more rule bases for an expert system usable to profile cyber threats detected in a target environment, comprising the steps of:
  for each alert of a training set of alerts triggered by a potential cyber threat detected by an SIEM:
    retrieving captured packet data related to the alert; and
    extracting training threat data pertaining to a set of attributes from captured packet data triggering the alert;
  generating a predictive model of the level of risk posed by an alert based on attribute values for that alert by analysing the captured training threat data pertaining to the set of attributes; and
  generating a set of fuzzy rules based on the predictive model, said rules being usable at run time in a fuzzy logic engine to evaluate data pertaining to one or more of the extracted attributes of a detected cyber threat to determine values for one or more output variables indicative of a level of an aspect of risk attributable to the detected cyber threat.

It is to be understood that one or more of the features optional in embodiments of the above-described first aspect of the present may also be employed in preferred embodiments of the second aspect of the invention, adapted mutatis mutandis.

Viewed from another aspect, the present invention provides computing apparatus for profiling cyber threats detected in a target environment, comprising: one or more processors; and computer readable medium comprising instructions which when executed, cause the computing apparatus to be operable to carry out any of the methods described in relation to the above aspects and preferred embodiments of the invention.

Viewed from yet another aspect, the present invention provides a computer program product comprising instructions which when executed, cause computing apparatus having one or more processors to be operable to carry out any of the methods described in relation to the above aspects and preferred embodiments of the invention.

BRIEF DESCRIPTION OF THE DRAWINGS

Certain preferred embodiments of aspects of the invention will now be described, by way of example only, in relation to the appended drawings, in which:

FIG. 7 shows the operation of the CTP tool set at training time;

FIG. 8 shows the operation of the CTP tool set at run time;

FIGS. 11 and 12 show, respectively, representations of the GUIs of Security Onion components SGuil and Squert used in CTP to provide Network Security Monitor and Intrusion Detection System alerting and analysis capabilities;

DETAILED DESCRIPTION OF THE EMBODIMENTS

In a preferred embodiment of aspects of the present invention to be described in the following detailed description, a Cyber Threat (CT) Profiler (CTP) tool set is provided. The tool set comprises a series of computer software components that, when executed by a general purpose computer coupled to a target computing environment, causes the computer to implement logical modules that configure the computer to be operable by a systems administrator to profile (aspects of) the CT risk of potential cyber threats detected by components of the security infrastructure of the target computing environment. Specifically, in the below-described embodiment, the tool set allows the systems administrator to determine the sophistication risk and capability risk of SQL injection attacks detected by an Intrusion Detection System/Network Security Monitor in the target computing environment. It should nevertheless be understood that the present invention is applicable to identify a variety of other risk factors associated with a variety of other attack vectors detected as potential cyber threats by other components of the security infrastructure of different secure computing environments.

The exemplary CTP tool set described here was developed and implemented to demonstrate that the present invention can effectively use information provided from Network Security Monitoring (NSM) to accurately detect the capability and sophistication of an SQL Injection Attack (SQLIA) to support decision making by system administrators. As will be shown, the exemplary CTP tool set demonstrates that for each SQL injection attack detected, the CTP tool set is able to provide a measure of a level of risk posed by the detected attack in the form of the sophistication surrounding the attack and the likely degree of capability of the attacker.

Figure 1:
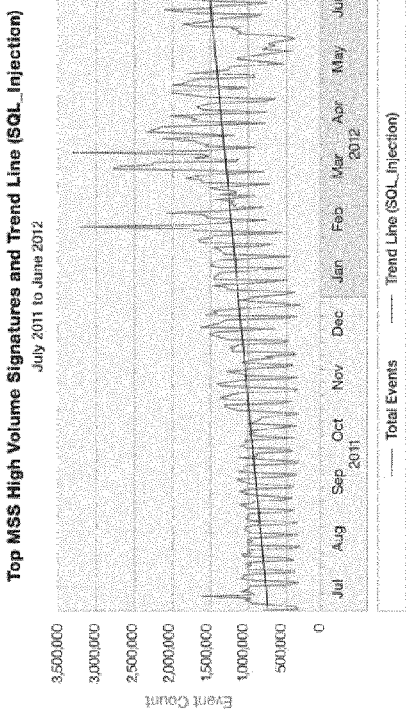
FIG. 1 is an extracted graphic from IBM Corporation's X-force Trend and Risk Report 2012 illustrating the increasing rate of SQL injection attacks in the cyber sphere.
Figure 2:
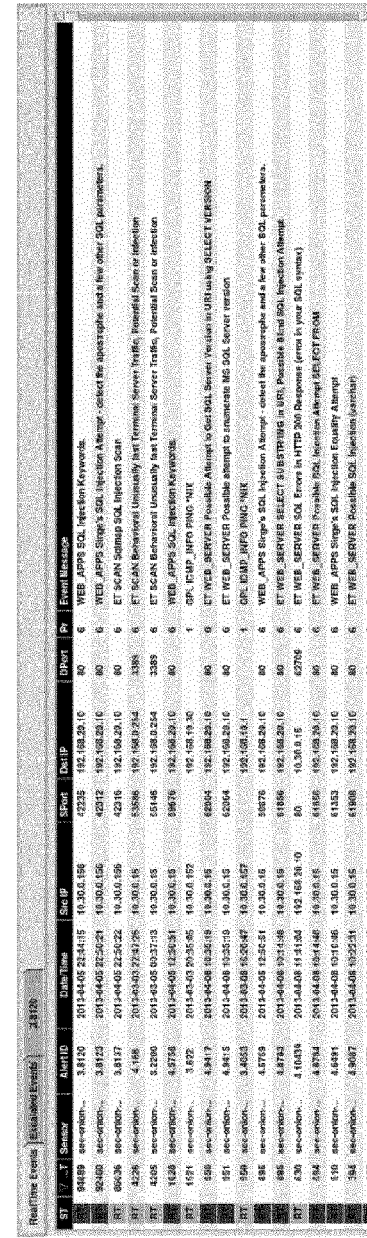
FIG. 2 shows an example of the alerts that can be collected in real-time use by an SIEM from SQL injection attacks detected by a network security monitor and presented in a dashboard.
Figure 3:
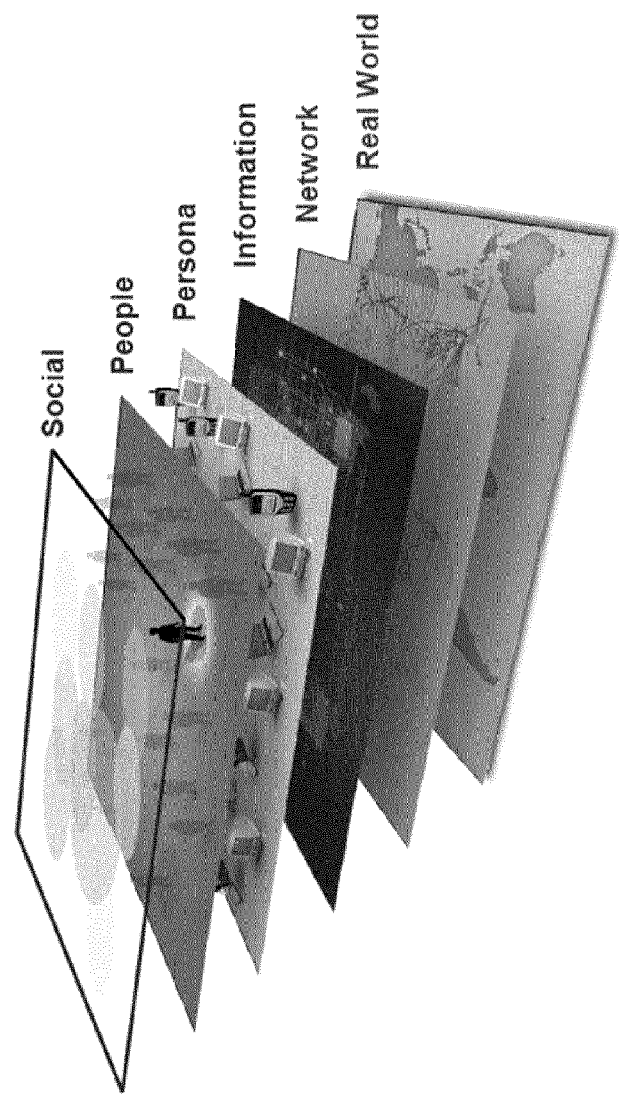
FIG. 3 represents the various layers that make up the cyber-threat sphere.

FIG. 3 represents the various layers that make up the cyber-threat sphere. The CTP of the present invention and in the exemplary embodiment described herein covers the Persona, Information and Network layers. It provides information obtained from the Network and Information layer to give an overview of the persona layer that may enable further clarification of the People layer.

Figure 4:
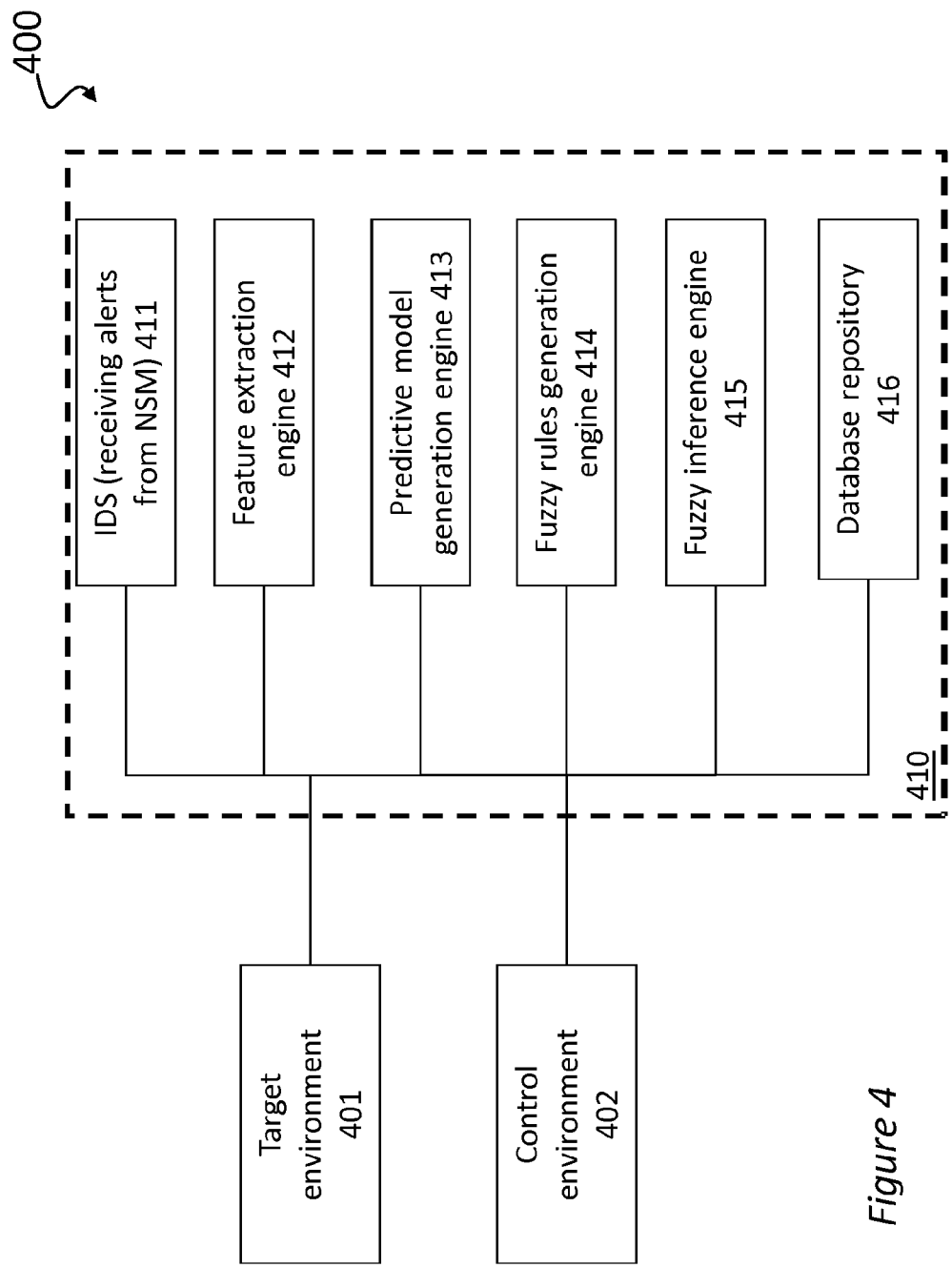
FIG. 4 illustrates an exemplary system including a target computing environment, a control computing environment, and a Cyber Threat Profiler (CTP) in which aspects of the present invention are implemented.

FIG. 4 illustrates an exemplary system 400 in which aspects of the present invention are implemented. The system 400 includes a target computing environment 401, a control computing environment 402, and a CTP 410.

Target Computer Environment 401

Figure 5:
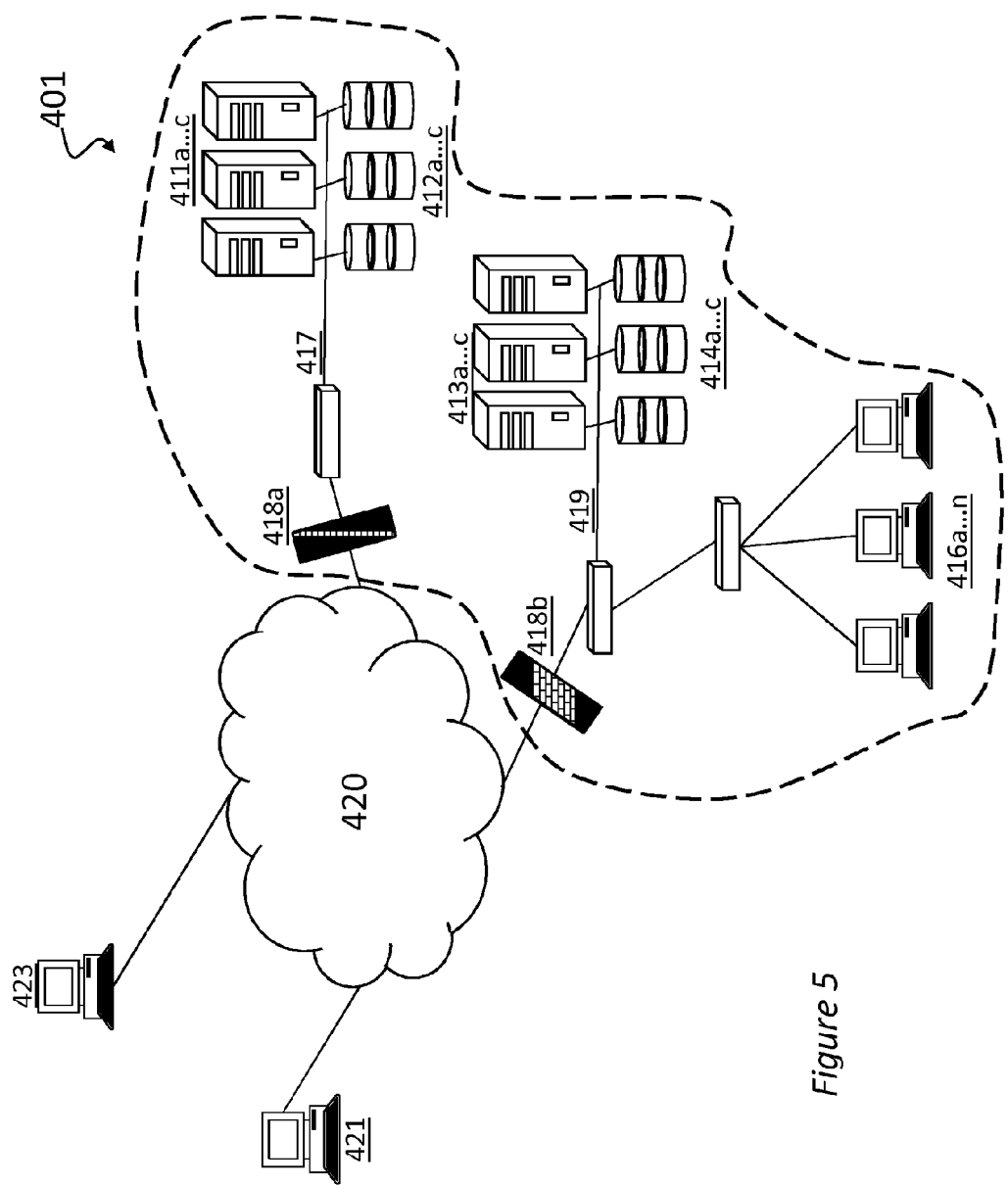
FIG. 5 shows an exemplary target computing environment that the cyber threat profiling tool and method of the exemplary embodiment of the invention is to monitor for the filing of cyber threats detected by one or more network security monitors in the target computing environment.

FIG. 5 shows an exemplary target computing environment 401 that the cyber threat profiling tool set of the exemplary embodiment implementing aspects of the present the invention is to monitor for the profiling of cyber threats detected by one or more network security monitors in the target computing environment 401.

The target computing environment 401 includes one or more servers 411a . . . c 414a . . . c communicable with each other and with one or more databases 413 a . . . c 415a . . . c via a network, for example, the Internet 420. The servers 411a . . . c 414a . . . c may be one or more application servers, web servers, or database servers. These elements of the target computing environment 401 include one or more software components, middleware components, hardware components and/or virtual hardware components that may individually or in combination provide resources that embody, for example, an E-commerce platform, a government secure network, an organisational information technology infrastructure, a website, a database resource, or a Software as a Service provider.

In the example target computing environment 401, one or more terminals 416a . . . n are provided that may be operable by one or more users to access, administer and create resources provided or supported by the computing environment, or by one or more system administrators to manage the resources provided by the computing environment and also to manage access thereto.

The elements of the target computing environment 401 may be coupled to each other or communicable with one another via one or more networks, such as local area networks 417 419. The target computing environment 401 may be provided as, for example, a business-to-business (B2B) and/or business-to-consumer (B2C) platform, or as a general networked data or service resource. In order to allow the computing environment to be accessed by these end-users, for example to enable transactions to take place, or even to allow elements of the target computing environment 401 to communicate with each other, components of the target computing environment are connected to a publicly accessible network such as the Internet 420. The target computing environment 401 may provide various channels of access to agents outside the target computing environment 401. For example, if the target computing environment 401 implements a B2C e-commerce website, the servers 411a . . . c 414a . . . c and databases 413 a . . . c 415a . . . c may provide a web server, database server and payment system to implement a website usable, for example, to purchase goods or query stock levels and take payments. External user agents operating a general purpose computer terminal 421 connected to the Internet may access the website by pointing a browser to the URL associated with the website. The target computing environment 401 is configured to interact with external user agents in normal use to provide a certain user experience in which access is only intentionally afforded to certain aspects of the resources supported thereby. For example, the user may be presented with certain web pages and web forms which are assembled from and provide indirect access to data and services supported by the target computing environment 401. The external user agent is not intended to have direct access to or interaction with certain aspects of the resources implemented by the computing environment. For example, the user may interact with the web site to view items offered for sale and input payment details to complete purchases. However, the user is not intended to be able to access the raw product and stock database directly, nor should the user be able to access the payment system directly.

To prevent external agents from accessing the computer resources in these unintended modes of interaction, to avoid, for example, malicious agents or hackers from being able to access other user's payment details, the target computing environment 401 may implement one or more software, middleware, hardware and/or virtual hardware components that together provide a security infrastructure about the computing environment.

The security infrastructure may be configured to control user interaction with the computer resources to ensure the confidentiality of sensitive information, the integrity of the system, and the availability of the system resources. Security countermeasures that control and monitor user access to attempt to ensure the above three characteristics of secure systems are generally well known and include the use of user account-controlled interaction, firewalls, malware monitoring, antivirus software, and "secure" connections, protocols and encryption. As can be seen from FIG. 4, the hardware components of the target computer environment 401 communicate with the Internet only via firewalls 418a, 418b that are intended to monitor and control incoming and outgoing network traffic.

Nevertheless, almost any computing environment 401 that is publicly accessible by, for example, the Internet 420, will have inherent security vulnerabilities due to its design and due to limitations in the effectiveness of the security infrastructure. Thus external malicious agents, such as hackers, may operate user terminals 423 to exploit these security weaknesses to illicitly gain access to aspects of the computing resources made available by the target computer network in order to, for example, obtain confidential information such as payment details, compromise the system integrity to obtain control of elements of the resources, and to inhibit the availability resources.

One common attack vector to compromise the security of computing environments is SQLIA. For example, target computer environment 401 provides access to database resources by a web form made available via a URL on the Internet. External user agents such as 421 may interact with the computer environment to, for example, log in to a user account using a username/password pair to purchase goods or query stock levels by inputting free text into the fields of the different web forms. However, a malicious external agent 423 may also access the computing environment 401 via internet 420 to navigate to the website and attempt to illicitly gain access to facets of the resources made available by the computing environment by way of an SQL injection attack. Such an attack can involve inputting certain strings into the fields of the web forms unanticipated by the administrators of the computing environment 401 which cause the computing environment to respond in an unintended way to return data say as the confidential username/password pairs of real users. SQL injection attacks may also be proliferated by hackers using cookies. In this way, hackers can exploit security weaknesses in the target environment 401 to access confidential information and use this information to perform illicit, criminal activity, such as stealing credit card details.

In order to police access to the computer resources made available by the target computing environment 401, and to help avert cyber attacks, an SIEM is implemented within the computing environment 401 in one or more software and/or hardware components to provide a system administrator operating one of terminals 416a . . . n with up-to-date information about the operation and detection events of various components of the security infrastructure.

As mentioned above, the target computing environment 401 has a Network Security Monitor installed in one or more software and/or hardware components. The Network Security Monitor is configured to monitor incoming network traffic and detect potential cyber threats. On detection of a potential SQL injection attack, the Network Security Monitoring solution creates an alert and forwards it to the SIEM, which is presented to a system administrator operating a terminal 416a . . . n in a dashboard (constituting part of an Intrusion Detection System).

On receipt of the alerts, the SIEM or other network security components may provide some degree of functionality allowing the system administrator to drill down into the data captured on the network, such as by a packet capture or sniffing software suite, to investigate the detected cyber threat further, and, potentially, intervene to prevent the cyber threat from successfully attacking and gaining access to the resources provided by the computer environment, for example by blocking packets from the IP address of the attacker.

The CTP 410 operates to analyse cyber threats detected in target environment 401 by the security infrastructure thereof, to provide an indication of a level of one or more aspects of CT risk attributable to the detected threat alongside the alert provided in the SIEM.

The Control Environment 402

Figure 6:
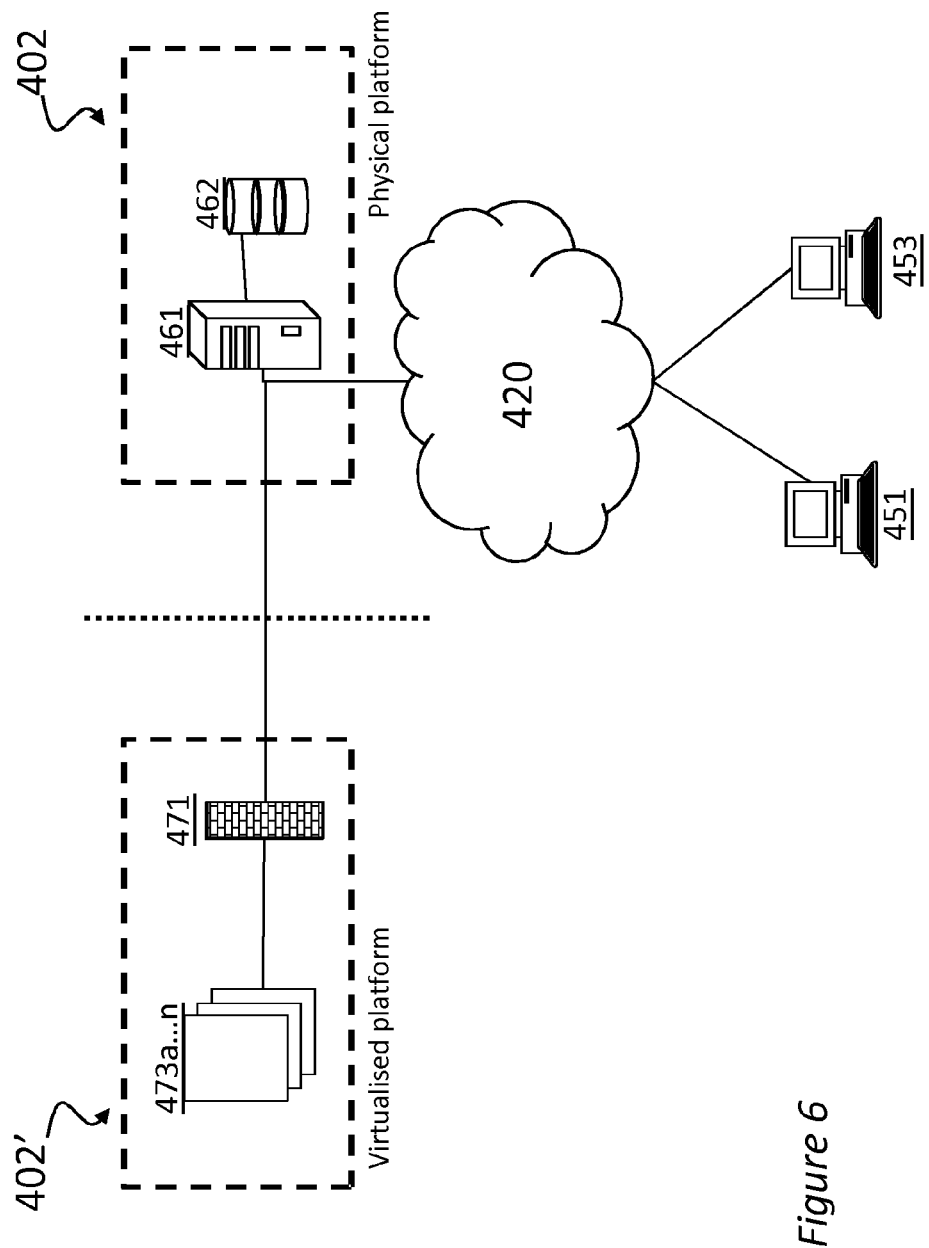
FIG. 6 shows an exemplary control computing environment that is used to collect training data pertaining to cyber attacks usable to generate a Cyber Threat Profile to protect a target computing environment.

Referring to FIG. 6, the "control environment" 402 provides a controlled environment in which a range of resource are accessible by hackers to provides a safe way to collect example hacking data usable to derive the predictive model of the CTP 410 to be used to assess cyber risks in real time.

The control environment 402 comprises a physical server 461 and database resource 462 coupled to and accessible via the Internet 420 by one or more Internet enabled user terminals 451, 453. The physical server 461 and database resource 462 may together implement hypervisor software to support a virtualised platform 402' including one or more security components such as a firewall and Network Security Monitor 471 and one or more computer resources 473a . . . n configured to provide e.g. vulnerable web applications and databases that are purposefully exposed to attack and exploitation by hackers operating terminals 451, 453.

The control environment 402 is preferably modelled on target environment 401 to have similar security weaknesses such that the predictive model developed therefrom by CTP 410 is applicable to give the risk levels relating to cyber threats taking into account on the weaknesses of the target environment 401. The control environment 402 is an established system that will continue to evolve to provide a number of scenarios delivering challenges requiring varying degrees of capability and skill to complete. It represents a realistic IT system and will collect attack data that will be used to reliably and efficiently fine tune the response via the CTP 410.

The Control environment 402 is preferably an Unattributable/Deniable environment to the owner of the target computer environment 400 and may be provided by an independent entity and may not be hosted or related to the target computer environment 401.

The Cyber Threat Profiler (CTP) 410

The CTP 410 is a tool set of logical and data components usable to carry out methods of aspects of the invention to profile the risk of cyber threats in target environment 401.

In use in target environment 401, the CTP 410 analyses collected data relating to cyber threats and provides a confidence rating on one or more aspects of the CT risk associated with the threat, such as the likely capability and skill of the originator of the attacker and the likely sophistication of the attack in question. The CTP 410 is an expert system implementing an artificial intelligence (AI) process that analyses the security events identified in the security infrastructure of a target environment 410 and compares them against the test benchmarking dataset collected from the control environment 402 using a set of fuzzy rules derived therefrom and a fuzzy inference process to reason over the rules.

The CTP tool set 504 is designed to build a set of rule-based profiles that can operate within any threat scenario, including Internet attacks to the target computing environment 401. Although the exemplary CTP tool set 410 as described here is limited to addressing SQLIA, the tool set can be easily extended to other cyber-threats such as XSS and Phishing attacks.

Referring again to FIG. 4, the exemplary CTP 410 includes:

Intrusion Detection System 411;
Feature extraction engine 412;
Predictive model generation engine 413;
Fuzzy rules generation engine 414;
Fuzzy inference engine 415; and
Database repository 416.

To allow the system administrator of target computer environment 401 to contextualise the incoming security alerts and prioritise them to assist in dealing with the cyber threats effectively and appropriately, the CTP 410 causes the system to additionally provide in relation to each alert in the SIEM a CT risk level indication, in this case, an indication of the risk of the level of sophistication of each SQL injection attack, and the level of capability of the originator of the attack. The CTP converts alerts from the NSM system into a more intelligent assessment of the detected attack. This method of correlation also removes the need to manually analyse and discard the false positives of common, less threatening probes.

These relative risk level estimations are derived from information pertaining to the attack retrieved from the target computer environment, and are based on reasoning using fuzzy logic over an expert fuzzy rule base derived from a predictive model generated using, for example, associative rule learning or statistical classifier learning, from a set of training data. The model is particular to a specific target environment, taking into account that environment's vulnerabilities, and may be updated and refined in use, for example periodically, to take in to account practical experience of cyber threat data obtained in the field.

The CTP tool set 410 is based around the analysis of 'Big Data' obtained from the Network and Information layers, the output of which determines the capability and sophistication at the Persona layer (see FIG. 3).

All or some of the components of CTP 410 are hosted on or across one or more hardware components of the target computer environment 401, for example. In the example embodiment the components are hosted in a virtualised platform within a private cloud. The components of the CTP 410 tool set will now be described Intrusion Detection System 411

Intrusion Detection System 411 monitors the target computer environment 401 and/or control environment 402 for potential cyber threats and receives alerts generated from security components (such as Network Security Monitor) and infrastructure of the computing environments whereupon the Intrusion Detection System 411 presents them to a user. The Intrusion Detection System 411 may form part of an SIEM in target computer environment 401.

On receipt of an alert, for example, for an SQLIA attack, the Intrusion Detection System 411 retrieves captured packet data from the network relating to the potential cyber attack that triggered the alert, and stores the packet data and alert data in a repository 416, for example, in a relational database.

The Feature Extraction Engine 412

Before packet data pertaining to the alerts can be analysed at training time and runtime, the feature extraction engine 412 first pre-processes packet data to extract data pertaining to one or more attributes of the attack. These 'features' may relate, for example, to the IP address of the sender of the message on the network constituting the alerted attack, the platform being used by the attacker to mount the alerted attack, and a sensed attack type. The features used may be pre-selected by the system administrator, or selected algorithmically. A script may be used then to extract the attribute values for specific attacks.

The Predictive Model Generation Engine 413

The predictive model generation engine 413 provides an analysis environment that is used in the training phase to generate a predictive model to correlate, associates or classify the alerts based on the captured packet data (retrieved from repository 416) relating to attacks detected within the control environment 501. The attribute data extracted by feature extraction engine 412 is used.

Any suitable artificially intelligent machine learning or data mining techniques, such as clustering, classification or associative rule generation, which can be used to identify patterns in the attacks based on packet data or attributes derived from packet data, can be used in the predictive model generation engine 413.

The predictive model generated by predictive model generation engine 413 is stored in data repository 416, such as in log files. In use, while the CTP 410 is being used to monitor target environment 410, the predictive model generation engine 413 may be used to refine the predictive model based on attack data detected in situ.

Fuzzy Rules Generation Engine 414

The fuzzy rules generation engine 414 generates one or more fuzzy rule bases comprising fuzzy rules and being usable to evaluate a CT risk indicator. The fuzzy rules generation engine 414 automates the generation of the rule base for the expert system using the artificially intelligent predictive model generated by prediction model generation engine.

The predictive model itself attempts to meaningfully identify similar types of attack or clusters of attacks based on them having similar characteristics or features observed in the attribute data extracted from the captured packets. These clustered/associated/classified attacks are used to generate the fuzzy rule antecedents. Conversion to fuzzy sets based on linguistic variables for the attributes may be needed in order to convert significant attribute ranges of the clustered attacks into fuzzy rules.

The fuzzy rule generation engine 414 also uses knowledge/prediction about how the resources of the target environment 401 would respond to the clustered attacks, either input using expert knowledge, analysis or from the response of the resources in the control environment 402, to provide some indication of a resultant aspect of CT risk that is predicted to result from the clustered attacks indicated by the rule antecedent. The likely risk presented by the attacks converted to a fuzzy set of a linguistic fuzzy risk variables may be used as the fuzzy rule consequent.

The predictive model generation engine and/or fuzzy rule generation engine 414 may be operated to produce different rule bases by grouping together related attributes and generating predictive models and/or rules based on only attributes in a group. For example, all attributes relating to the geographical indications of the attacker may be grouped together to generate a set of rules usable to indicate a geographical risk factor for cyber attacks. Similarly, the attributes pertaining to the platforms used by attackers may be grouped together to generate a set of rules usable to indicate a platform risk. The grouping of the attributes may be achieved by performing feature selection on the attributes.

The rule bases are then stored in repository 416 to be accessed by fuzzy inference engine 415.

Fuzzy Inference Engine 415

The fuzzy inference engine 415 is operable at runtime to monitor data relating to cyber alerts detected by Intrusion Detection System 411 in target computing environment 401 and, based on attribute data derived from captured packets relating to the alerted attack, to apply fuzzy logic to determine a CT risk level for the attack.

This is achieved by the fuzzy inference engine 415 fuzzifying the input attribute values over the fuzzy sets of the relevant linguistic input fuzzy variables. The fuzzy inference engine 415 then reasons the input fuzzy variables over the rule bases stored in repository 416 and obtains one or more output fuzzy variables as a result, each being usable in indicating an aspect of CT risk. Finally, the fuzzy inference engine 415 defuzzifies the one or more output fuzzy variables to determine crisp values for one or more output variables indicative of a level of an aspect of risk attributable to the cyber threat. Before defuzzification, the fuzzy inference engine 415 may optionally combine one or more output fuzzy variables by reasoning over further fuzzy rules.

Thereafter, the Intrusion Detection System 411 may rank the received alerts in priority based on the respective CT risk they represent. The alerts may accordingly be displayed to the system administrator in a risk-priority based manner.

The method of operating the CTP 410 in the training phase will now be described.

Operating the CTP 410 in Training Phase

FIG. 7 shows a method 700 of how the CTP 410 is operated during training phase to automatically generate one or more rule bases for an expert system usable to profile cyber threats detected in a target environment. Other methods of generating rule bases for use at run time are possible as an alternative or additional measure.

First, in step 701, the Intrusion Detection System 411 collects and stores alerts triggered by a potential cyber threat detected in control environment 402 by an SIEM, together with captured packet data related to the alerts.

In step 702, the CTP tool set 410 retrieves captured packet data related to the alert, for example, from repository 416.

Next, in step 703 the feature extraction engine 412 extracts training threat data pertaining to a set of attributes from captured packet data triggering the alert.

Once the attributes have been extracted for all alerted attacks in the training set, in step 704, a predictive model of the level of risk posed by an alert based on the attribute values for that alert is generated by analysing the captured training threat data pertaining to the set of attributes.

Finally, in step 705, the fuzzy rule generation engine 414 generates a set of fuzzy rules based on the predictive model. The rules are usable at run time in a fuzzy logic engine to evaluate data pertaining to one or more of the extracted attributes of a detected cyber threat to determine values for one or more output variables indicative of a level of an aspect of risk attributable to the detected cyber threat.

Preferably, the predictive model and the assessed CT risk posed by the cluster of training set cyber threats to the target environment are used to generate membership functions for the fuzzy sets of the input and/or output fuzzy variables and/or to generate crisp value conversion functions for non-numeric input attribute values.

The method of operating the CTP 410 at run time to profile cyber threats in target environment 401 will now be described.

Operating the CTP 410 at Run Time

FIG. 8 shows a method 800 of how the CTP 410 is operated at runtime to profiling cyber threats detected in target environment 401.

First, in step 801, if the Intrusion Detection System 411 receives an alert (e.g. from an NSM) triggered by a potential cyber threat detected in target environment 401 by an SIEM, then the process continues to step 802, otherwise the process loops back and waits for an alert.

In step 802, the captured packet data related to the alert is retrieved, for example, from a Network Security Monitor or other security infrastructure in target environment 401. Then, in step 803, data pertaining to a set of attributes is extracted from captured packet data triggering the alert using feature extraction engine 412.

Next, in step 804, the fuzzy inference engine 415 applies fuzzy logic to data pertaining to one or more of the attributes to determine values for one or more output variables indicative of a level of an aspect of risk attributable to the cyber threat.

The fuzzy logic comprises one or more rule bases comprising fuzzy rules and being usable to evaluate a CT risk indicator. Each fuzzy rule of a rule base has: as an antecedent, a fuzzy set of one or more input fuzzy variables each representative of a said attribute and any logical operators connecting input fuzzy variables, and as a consequent, a fuzzy set of an output fuzzy variable representative of the CT risk indicator.

When applying the fuzzy logic to the attributes of the alert, the fuzzy inference engine 415, for each fuzzy rule of a rule base, performs the following. For each input fuzzy variable of the antecedent, the fuzzy inference engine 415 fuzzifies data pertaining to the attribute represented by the input fuzzy variable to determine a membership value across the fuzzy set of the input fuzzy variable. The fuzzy inference engine 415 evaluates the antecedent, performing any declared fuzzy logical operators to provide a single membership value. The fuzzy inference engine 415 then evaluates the consequent by performing a fuzzy implication operator on the antecedent to determine the membership value of the relevant output cyber threat indicator.

Fuzzifying data pertaining to the attribute represented by the input fuzzy variable comprises the fuzzy inference engine 415 converting the threat attribute to a crisp value in the universe of discourse and applying the membership function for the relevant fuzzy set.

The fuzzy inference engine 415, for each rule base, aggregates the membership values output by each rule to produce a combined membership value for the CT risk indicator output by the rule base. The fuzzy inference engine 415 defuzzifies the membership values for each CT risk indicator output by the fuzzy logic to provide a crisp CT risk indicator value.

A significant advantage offered by the present invention is in its ability to continually evolve and respond to the latest hacking trends keeping up to date with the latest cyber threats, and to fine-tune the predictive models for cyber risks through regular and uninhibited exposure to the latest hacking trends and techniques collected in the control environment 402. This is achieved from open exploitation of a control environment 402, for example by actually incentivising hackers to try to exploit security weaknesses in the control environment by offering a 'Capture the Flag' (CTF) competition environment.

A number of CTF environments can be offered, for example, by a third party, each with specific technical security vulnerabilities. The CTF environments have been exposed to teams of professional security novices and experts at CTF events (a type of technical hacking game). These teams try to attack and exploit vulnerabilities they can identify to locate specific attributes (flags') hidden within the system in order to win the competition.

Through these competitions, it is possible to build a database of attack vectors to be used as example data in devising the predictive model for CT risk for given target environments 401. This collected CTF attack data can be normalised and used to build a predictive model by the predictive model generation engine 413 and correlated with new attacks and to allow real-time attack data to be analysed by the CTP 410 in use in the target environment 401 to determine the seriousness and sophistication of the attack and ultimately, to support decision-making.

In the example embodiment (to be described in more detail below), a specific virtual IT control environment 402 was built with a specific integrated NSM solution and vulnerable web applications that can be successfully exploited by SQLIAs. From the configuration of this control environment 402, it is possible to derive the most important attacker characteristics and how they relate to each other from this process.

In use, in the target environment 401, when an alert is initiated by the NSM solution, it forms the input into the CTP tool set 410. The CTP 410 analyses the events using the predictive model built on the control environment data by the predictive model generation engine 413 and provides an output that consists of a resultant SQLIA risk rating, providing a capability and sophistication level of the attacker.

In order to ensure regular and quality attacks from multiple international sources, an on-line version of the CTF environment can be used through the provision of a public facing (non-attributable) portal as well as the continued off-line use at various security and hacker events.

The control environment 402 can be developed to simulate other Internet facing features, such as; mobile computing applications, cloud environments and thick client applications. Additional cyber technologies such as SCADA or wireless systems can also be integrated. This will increase the quantity and quality of control data for the optimisation algorithms and the types of attack being profiled.

The present invention provides a means to increase a system administrator's understanding of the seriousness of an attack on a target computing environment 401 and provide a methodology for determining the likely profile of an attacker; e.g. from an amateur with basic hacking skills to a sophisticated attacker incorporating many attack vectors. It is the constantly changing modes of attack within the control environment 402 that will provide the useful data to help continually improve our understanding of an attacker.

The abovementioned components of the system 400 will now be described in more detail with reference to an example CTP 410 provided to illustrate the operation of the aspects of the invention. First, however, we will now briefly explain the technical concepts that have derived the basis of the output: the sophistication and capability of the attack. This section introduces a number of computer science concepts within the field of Artificial Intelligence that have been used to develop the CTP tool set.

Artificial Intelligence

Artificial Intelligence (AI), is the study of intelligent systems (i.e. software, computers, robots, etc.). Alternatively, it may be defined as "the study and design of intelligent agents", where an intelligent agent is a system that perceives its environment and takes actions that maximize its chances of success. John McCarthy, who coined the term in 1955, defines it as "the science and engineering of making intelligent machines".

The CTP tool set 410 is an example of an intelligent agent that analyses PCAP packets related to SQLIA attacks to produce an output that is both useful and intelligent to the environment in which those PCAP files were captured.

Heuristics

A heuristic algorithm follows a "rule of thumb," or a good guide when making decisions. Computer programmers aim to create the most efficient algorithms to accomplish various tasks. These may include simple processes like sorting numbers or complex functions such as processing images or video clips.

Therefore, a heuristic process may include running tests and getting results by trial and error. As more sample data is tested, it becomes easier to create an efficient algorithm to process similar types of data. These algorithms are not always perfect, but work well most of the time. The goal of heuristics is to develop a simple process that generates accurate results in an acceptable amount of time.

The CTP tool set 410 utilises a number of algorithms to analyse specific attributes of datasets from PCAP files to determine the sophistication and capability of an SQL injection attack. These algorithms are a heuristic analysis of probability.

Statistics

Statistics is the study of the collection, organization, analysis, interpretation, and presentation of data. It deals with all aspects of this, including the planning of data collection in terms of the design of surveys and experiments.

Probability (or likelihood) is a measure or estimation of how likely it is that something will happen or that a statement is true. Probabilities are given a value between 0 (0% chance or will not happen) and 1 (100% chance or will happen). The higher the degree of probability, the more likely the event is to happen, or, in a longer series of samples, the greater the number of times such event is expected to happen.

The CTP tool set 410 makes use of a combination of statistics and probability to derive an output used by a security consultant to determine the next step of action that may need to be taken.

Classification

Classification theorem, in terms of mathematics, gives a non-redundant enumeration: each object is equivalent to exactly one class. It answers the classification problem "What are the objects of a given type, up to some equivalence?"

Fuzzy Logic

The term "fuzzy logic" was introduced with the 1965 proposal of fuzzy set theory by Lotfi A. Zadeh. Fuzzy logic has been applied to many fields, from control theory to artificial intelligence. Fuzzy logics however had been studied since the 1920s as infinite-valued logics notably by Lukasiewicz and Tarski.

Fuzzy logic, is a form of many-valued logic or probabilistic logic; it deals with reasoning that is approximate rather than fixed and exact. Compared to traditional binary sets (where variables may take on true or false values), fuzzy logic variables may have a truth value that ranges in degree between 0 and 1. Fuzzy logic has been extended to handle the concept of partial truth, where the truth value may range between completely true and completely false. Furthermore, when linguistic variables are used, these degrees may be managed by specific functions.

Defuzzification, is the process of producing a quantifiable result in fuzzy logic, given fuzzy sets and corresponding membership degrees. It is typically needed in fuzzy control systems. These will have a number of rules that transform a number of variables into a fuzzy result, that is, the result is described in terms of membership in fuzzy sets. Defuzzification is interpreting the membership degrees of the fuzzy sets into a specific decision or real value.

The CTP tool set 410 that has been deployed to analyse SQLIAs using a number of algorithms that fall within the definitions provided in this section to make sure that the output is as accurate and reliable as can be expected given the inputs that have been used.

Detailed Example Embodiment—The Target and Control Environments

The purpose of the Cyber-Threat Profiler (CTP) tool set 410 developed by the applicants which will now be described in detail in the example embodiment to test the hypothesis that: 'information provided from an SIEM, can be used to accurately detect the capability and sophistication of an SQLIA'; to support decision making.

The analysis process performed by CTP 410 is implemented by developing a prediction model built by predictive model generation engine 413 using cyber-attack patterns collected by control environment 402. The sophistication and capability of an attacker in use is based on the correlation by the prediction model of the "real life" attack data against empirical data received from various 'Capture the Flag' competitions. The CTF control environment 402 is specifically built to assist in developing the CTP tool kit 410.

In the detailed example, two physical servers, Xenserver 1 called xen.hackeire.net and XenServer 3 were provided.

Xenserver 1 hosted control 'CTF' environment 402.

Xenserver 3 hosted IDS 411, feature extraction engine 412, predictive model generation engine 413, fuzzy rule generation engine 414, fuzzy inference engine 415 and database resource 416 and the remaining components of the CTP tool set 410. The database 416 can be for example a MongoDB or a MySQL implementation.

XenServer 3 was also part of the target environment 401 acting as a physical gateway and using a virtual Windows 2008 R2 host which has been built as a touchdown server, and provides administrative access to the environment. The XenServer 3 physical server also hosts the virtual Ubuntu-Desktop which has the 413, fuzzy rule generation engine 414, fuzzy inference engine 415 and database resource 416 and the remaining components of the CTP tool set 504.

The XenServer 1 physical server hosts the CTF environment and, in this case, a number of virtual workstations that are used to attack the CTF environment installed on Xen-Server 1. The XenServer 1 supported software-implemented network components consisting of router, the firewall/Network Security Monitor security component including a Network Security Monitor, and a load-balancer managing two virtual web servers. The virtual firewall/Network Security Monitor of Xenserver 1 in the CTF environment was configured to send alerts and related packet capture data to XenServer 3 where it is stored in repository 416 for use as training data.

Figure 9:
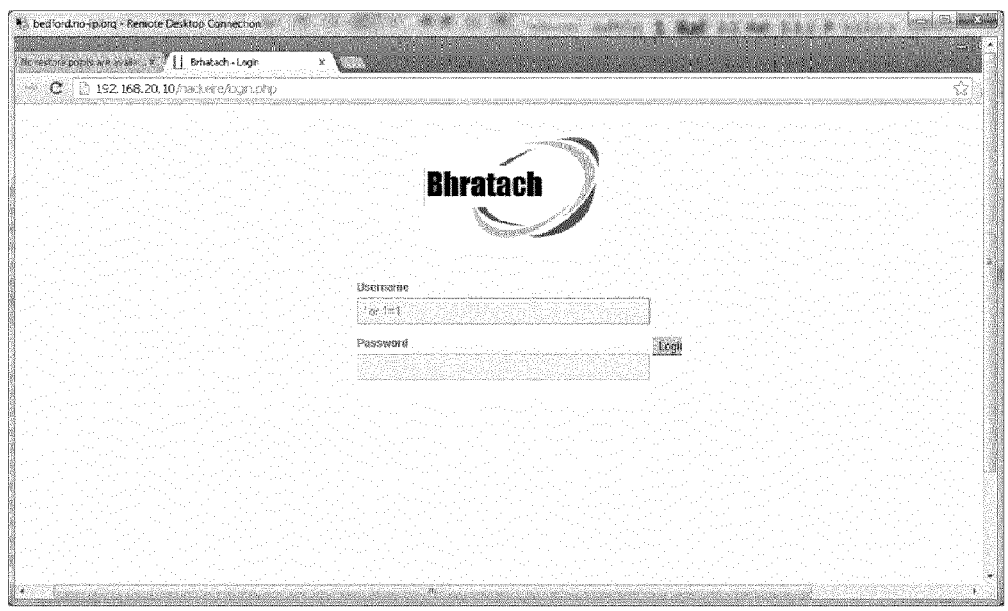
FIG. 9 shows a representation of a browser pointing to a vulnerable web application resource made available in control environment, which is being subjected to an SQL injection attack.

The two virtual webservers had one or more very vulnerable applications connected to MySQL databases. These web applications have a vulnerability to a number of specific SQLIA vectors and have been available to a number of the hacking community to provide the basis for the training data capture, as the behaviour is reflective of the target environment 401. The CTF environment in control environment 402 includes webservers that provide web applications that expose similar vulnerabilities to the resources provided by target environment 401. FIG. 9 shows a front page for a web resource "Bhratach" (Bhratach is the as gaeilga for 'Flag') made available in CTF environment, which provides an authentication mechanism for the controlling access to the vulnerable application. To collect information about how hackers attempt to break the security of the Bhratach resource by SQLIA attacks and how the Bhratach resource responds to those attacks, the Bhratach resource is made available to hackers in a CTF environment, and hackers are incentivised to hack the resource to try to capture flags along the way.

Figure 10:
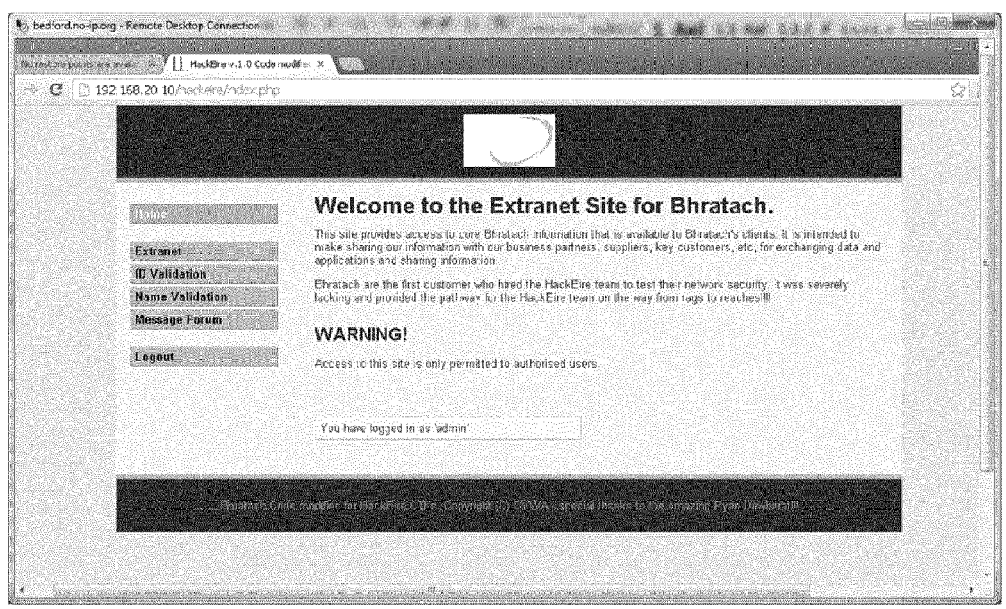
FIG. 10 shows the outcome on the web application of the SQL injection attack shown in FIG. 9.

FIG. 9 shows a straightforward SQLIA which a hacker may attempt to deploy by inputting into the username field of the username/password web form the string "'AND 1=1". FIG. 10 shows the impact of the SQLIA shown in FIG. 9 on the Bhratach resource. In this part of the application the hacker has managed to bypass the authentication mechanism using a straightforward SQL injection resulting in admin access to the Xen application. The operation of different types of SQLIA attack will be explained briefly later in this document.

Detailed Example Embodiment—Attack Detection, Alerting to IDS 411 and Packet Capture The objective is to detect potential SQLIA attacks on the Bhratach resource in virtual control environment 402 on Xenserver 1, and to alert them to IDS 411 in target environment 401 in XenServer 3, and also to store a collection of alert and related packet data pertaining to the alerts in repository 416.

In the example implementation, this is achieved by the firewall provided on the virtual platform of XenServer 1 and IDS 411 implemented in virtual platform of XenServer 3 being software implemented using "Security Onion", which is an open-source Linux distribution that contains a pool of security tools to provide a full NSM solution. As the Google Code Page for Security Onion states: "Security Onion is a Linux distro for IDS (Intrusion Detection) and NSM (Network Security Monitoring). Its based on Ubuntu and contains Snort, Suricata, Sguil, Squert, Snorby, Bro, Network-Miner, Xplico, and many other security tools."

The Security Onion toolset enables the security professional to analyse their network traffic with substantially increased visibility and with improved granularity. However, NSM is only able to provide a capability that allows the analyst to examine the actual packets with greater ease. It does not provide any intelligent analysis to the contents of the actual network packets—this is achieved using a feature extraction engine 412 implemented as a script (to be described later).

The Security Onion NSM implementation was installed inline within the control environment 402, thus enabling the NSM solution to capture all packets that transferred between an attacker and the vulnerable websites. A brief summary of the Security Onion tools and how they were used in the control environment 402 and target environment 401 will now be provided.

Snort: Snort is the IDS engine that is enabled on Security Onion within control Environment 400 to capture data from/to the control environment 402 and/or target environment 401.

Sguil & Squert: Sguil (or its web-based Squert front-end) are two tools that turn the Security Onion from an IDS into a NSM. They provide the key functions that analyse in detail the network activities.

Figures 11, 12:
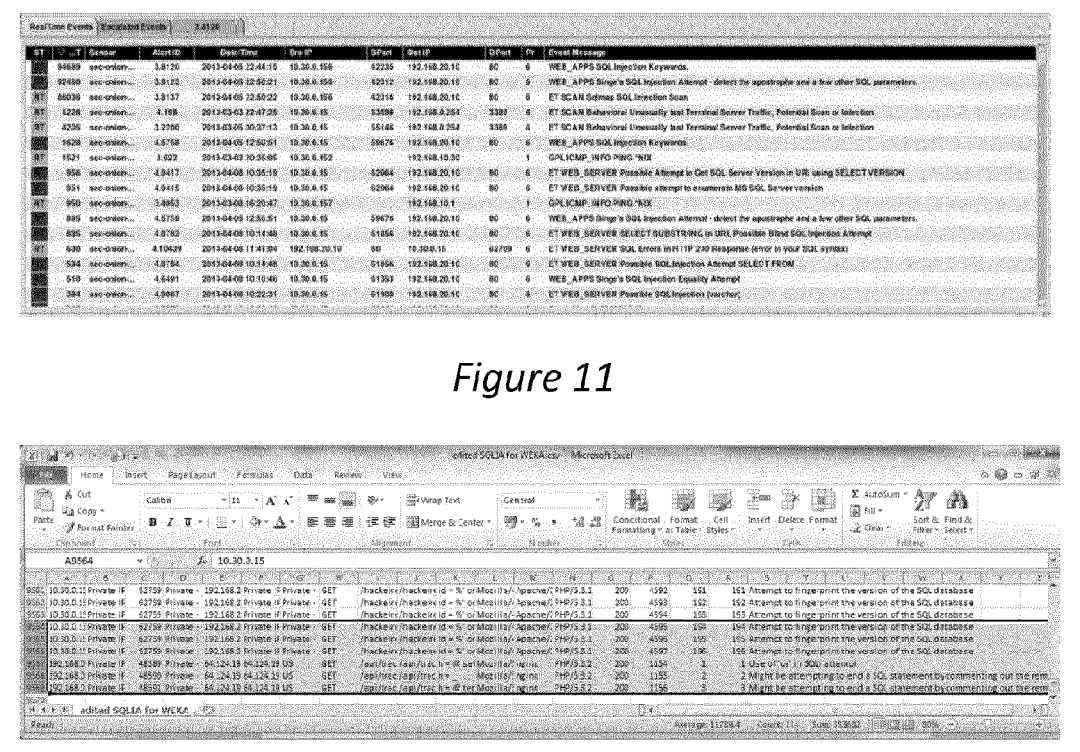

Sguil has its own GUI, shown in FIG. 11 that enables the analyst to interpret the alerts generated and received from the NSM, view the session data or the raw packets themselves As shown in FIG. 12, Squert is a web-based tool, launched through the browser (Firefox by default on Security Onion) that is used to query and view event data stored in a SGuil database.

Sguil and Squert applications provide context to the data that the analyst is viewing.

HTTPRY: The 'HTTPRY' application, within Security Onion, is a packet sniffer that specifically shows http traffic. This application is specifically useful given the HTTP nature of the vulnerable web applications and the logs the packet data traffic in the data repository 416 usable by the predictive model generation engine 413 to analyse packet data related to detected cyber threats.

An example extract of captured packet data logged in data repository 416 is set out below.

```
=+=+=+=+=+=+=+=+=+=+=+=+=+=+=+=+=+=+=+=+=+=+=+=+
   03/23-17:12:30.904710 10.20.5.245:39437 ->
   192.168.10.101:80
   TCP TTL:63 TOS:0x0 ID:48174 IpLen:20 DgmLen:266 DF
   *AP* Seq: 0x247B1B15 Ack: 0x3A3B75A2 Win:
   0xFFFF TcpLen: 20
=+=+=+=+=+=+=+=+=+=+=+=+=+=+=+=+=+=+=+=+=+=+=+=+
   03/23-17:12:30.904838 10.20.5.203:38826 ->
   192.168.10.101:80
   TCP TTL:63 TOS:0x0 ID:9461 IpLen:20 DgmLen:455 DF
   *AP* Seq: 0xF6BD0441 Ack: 0xD626FD50 Win:
   0x3908 TcpLen: 20
=+=+=+=+=+=+=+=+=+=+=+=+=+=+=+=+=+=+=+=+=+=+=+=+
```

Therefore, Snort, Sguil and HTTPRY provide the basic software security infrastructure for supporting the raw attack data collection, analysis and storage needed to support the CTP 410 tool set in the control environment 402 and target environment 401. In essence, these software elements together provide firewall/NSM 471 in target environment 401 and training environment 402, which produce alerts and packet capture data for collecting training data training time and alerting attacks at runtime, and IDS 411 in target environment 401, that is used both at training time and runtime.

However, to ensure that the above software components perform the function of the NSM and detect the desired attack vectors, Snort must be adapted accordingly to watch for and alert on SQLIAs.

Modifying Snort Rules for alerting Specific Attack Vectors

In our example, Snort is only using two rule files Downloaded.rules (rules downloaded from the associated signature ruleset) and local.rules (where we added our own local rules). In the example implementation, the local rules were adapted to create several alerts for the IDS for specific to different kinds of SQL attacks, as will now be described below.

SQL is a special-purpose programming language designed for managing data held in a relational database management system. The collection of SQL attacks is classified as "injection" attacks. This means an attacker utilises weaknesses (such as lack of input validation or use of parameterised queries) in an application that has a backend relational database. The attacker manipulates the input fields through the insertion of special characters that the database responds to. Through these special characters the attacker can and obtain information that the attacker is not permitted access too. This information could be extremely sensitive and damaging and ultimately lead to the compromise of the entire environment.

As mentioned above, SQLIA refers to the technique of inserting SQL meta-characters and statements into Web-based input fields in order to manipulate the execution of the back-end SQL statements. These attacks are directed primarily against another organization's Web server where the objective of SQLIA is to force the database system into running harmful code that can reveal confidential information, affect the integrity of the information or make the information unavailable. Therefore, the SQL injection attack can be considered as an unauthorized access of database. The attacks leverage the trust between the web application and the database server, that the developer hasn't correctly written his database queries or the fact that there is no input validation on the server to reject attack characters. It should be noted that an SQLIA can occur via a form, as well as through the fields of a cookie, in server variables or hidden statements.

'Improper Neutralization of Special Elements used in an SQL Command ('SQL Injection')' came top of list of the 2011 Common Weakness Enumeration's 25 Most Dangerous Software Errors with a score of 93%).

The SQLIA definitions that have been built in to the Snort rules in the security onion to detect possible SQLIAs are derived from the Common Attack Pattern Enumeration and Classification (CAPEC) International publicly available database (http://capec.mitre.orq/data/definitions/66.html). The CAPEC database is a community-developed list of common attack patterns along with a comprehensive schema and classification taxonomy. These attack patterns are descriptions of common methods for exploiting software systems. SQLIAs may broadly be divided up between a first order or second order attack. First-order Injection Attacks are when the attacker receives the desired result immediately, either by direct response from the application they are interacting with or some other response mechanism, such as email etc. Second Order injection Attack is the realization of malicious code injected into an application by an attacker, but not activated immediately by the application. The malicious inputs are seeded by the attacker into a system or database. This is used to indirectly trigger an SQLIA that is used at later time.

The major SQLIA types can be summarised as follows.

Standard SQL Injection (Skill or Knowledge Level: Low)

See http://capec.mitre.org/data/definitions/66.html. This attack exploits target software that constructs SQL statements based on user input. An attacker crafts input strings so that when the target software constructs SQL statements based on the input, the resulting SQL statement performs actions other than those the application intended.

SQL Injection results from failure of the application to appropriately validate input. When specially crafted user-controlled input consisting of SQL syntax is used without proper validation as part of SQL queries, it is possible to glean information from the database in ways not envisaged during application design. Depending upon the database and the design of the application, it may also be possible to leverage injection to have the database execute system-related commands of the attackers choice. SQL Injection enables an attacker to talk directly to the database, thus bypassing the application completely. Successful injection can cause information disclosure as well as ability to add, modify or delete data in the database.

In order to successfully conduct SQLIA, an attacker must determine the user-controllable input susceptible to injection. For each user-controllable input that the attacker suspects is vulnerable to SQL injection, attempt to inject characters that have special meaning in SQL (such as a single quote character, a double quote character, two hyphens, a parenthesis, etc.). The goal is to create a SQL query with an invalid syntax.

Examples of Methods to Attack Vulnerable Websites Using SQLIAs are as Follows:

- Use public resources such as "SQL Injection Cheat Sheet" at http://ferruh.mavituna.com/makale/sql-injection-cheatsheet-oku/, and try different approaches for adding logic to SQL queries.
- Add logic to query, and use detailed error messages from the server to debug the query. For example, if adding a single quote to a query causes an error message, try :"'OR 1=1; --", or something else that would syntactically complete a hypothesized query. Iteratively refine the query.
- Use "Blind SQL Injection" techniques to extract information about the database schema.
- Use stacking queries for denial of service attacks. This does not work on all platforms (most notably, it does not work on Oracle or MySQL). Examples of inputs to try include: "'; DROP TABLE SYSOBJECTS; --" and "'); DROP TABLE SYSOBJECTS; --". These particular queries will likely not work because the SYSOBJECTS table is generally protected.
- Use web browser to inject input through text fields or through HTTP GET parameters.
- Use a web application debugging tool such as Zap Proxy, Burp, WebScarab, etc. to modify HTTP POST parameters, hidden fields, non-freeform fields, etc.
- Use network-level packet injection tools such as netcat to inject input.
- Use modified client (modified by reverse engineering) to inject input.

The following are potential indications that an SQLIA may be the next step:

- Spider web sites for all available links.
- Sniff network communications of the application using a utility such as WireShark.

Blind SQL Injection (Skill or Knowledge Level: Medium)

See http://capec.mitre.org/data/definitions/7.html. Blind SQL Injection results from an insufficient mitigation for SQL Injection. Although suppressing database error messages are considered best practice, the suppression alone is not sufficient to prevent SQL Injection. Blind SQL Injection is a form of SQL Injection that overcomes the lack of error messages. Without the error messages that facilitate SQL Injection, the attacker constructs input strings that probe the target through simple Boolean SQL expressions. The attacker can determine if the syntax and structure of the injection was successful based on whether the query was executed or not. Applied iteratively, the attacker determines how and where the target is vulnerable to SQL Injection.

For example, an attacker may try entering something like "username' AND 1=1; --" in an input field. If the result is the same as when the attacker entered "username" in the field, then the attacker knows that the application is vulnerable to SQL Injection. The attacker can then ask yes/no questions from the database server to extract information from it. For example, the attacker can extract table names from a database using the following types of queries.

The application may have the following interactions with database:

"SELECT*FROM orders WHERE ordernum=_____"

"SELECT*FROM orders WHERE ordernum IN (_____)"

"SELECT*FROM orders WHERE ordernum in (_____) ORDER BY _____"

The mechanism to inject attacks into a vulnerable website is by appending the following expressions to the end of the original SQL interaction as follows depending on the back-end database:

"5' OR 1=1; --"

"5) OR 1=1; --"

"ordernum DESC; --"

The methods to utilise the blind SQLIA is as follows:

- Use web browser to inject input through text fields or through HTTP GET parameters.
- Use a web application debugging tool such as Zap Proxy, Burp, WebScarab, etc. to modify HTTP POST parameters, hidden fields, non-freeform fields, etc.
- Use network-level packet injection tools such as netcat to inject input.
- Use modified client (modified by reverse engineering) to inject input.

Determining the database type and version, as well as the right number and type of parameters to the query being injected in the absence of error messages requires greater skill than reverse-engineering database error messages.

SQL Injection through SOAP Parameter Tampering (Skill or Knowledge Level: Medium)

See http://capec.mitre.org/data/definitions/110.html. An attacker modifies the parameters of the SOAP message that is sent from the service consumer to the service provider to initiate a SQL injection attack. On the service provider side, the SOAP message is parsed and parameters are not properly validated before being used to access a database in a way that does not use parameter binding, thus enabling the attacker to control the structure of the executed SQL query. This pattern describes a SQL injection attack with the delivery mechanism being a SOAP message.

The attacker tampers with the SOAP message parameters by injecting some special characters such as single quotes, double quotes, semi columns, etc. The attacker observes system behaviour.

An attacker performs a SQL injection attack via the usual methods leveraging SOAP parameters as the injection vector. An attacker has to be careful not to break the XML parser at the service provider, which may prevent the payload getting through to the SQL query. The attacker may also look at the WSDL for the web service (if available) to better understand what is expected by the service provider.

Other SQLIA

The training data of cyber attacks stored in repository 416 and used to generate a predictive model using predictive model generation engine 413 consists of using the classification scheme as defined above, by collecting SQL injection attacks primarily from the CTF but also from other source including white papers, technical reports, web advisories, hacker on-line communities, web sites, and mailing lists.

The above definitions can be furthered classified using the following terminology.

Tautology: The tautology-based attack is used to inject code into one or more conditional statements such that the evaluation is always true.

Inference: In this attack, the query is being modified into the form of an action, which is executed based on the answer to a true/-false question about data values in the database. In this type of injection, the attacker tries to attack a site that is secured enough not to leak information about the database and so does not provide informational feedback via database error messages when an injection has succeeded.

Basic Union Queries: With this technique a malicious user tricks the server to return data that was not intended to be returned by the developers.

Piggy-Backed Queries: In this SQLIA, attackers do not aim to modify the query instead; they try to include new and distinct queries into the original query.

Code Injection: Code injection attacks attempt to add additional SQL statements or commands to the existing SQL statement.

LIKE Queries: The attacker attempts to manipulate the SQL statement using like queries.

Column Number Mismatch: This SQL attack can give errors that indicate that there is mismatch in the number of columns and their data type from the Union of the SysObjects table and the associated columns. The error "Operand type mis-match" is mainly because the data type mis-match in the Union clause caused by the injected string.

Additional WHERE clause: The case arises where there may be additional WHERE condition in the SQL statement that gets added after the injected string.

Insert—Subselect Query: The use of advanced insert query can help the attacker to access all the records of the database.

Functional Call Injection: Function call injection is the insertion of inbuilt database functions into a vulnerable SQL statement.

System Stored Procedures: In this type of SQLIAs the attacker tries to execute stored procedures present in the database. If the running backend server is known, the attacker perpetrates this attack to exploit the stored procedure.

Buffer Overflow: In several databases, Buffer overflows have been identified. Some database functions are susceptible to buffer overflows that can be exploited through a SQL injection attack in an un-patched database.

Error-Based Blind SQL Injection: The error based blind SQL Injection is the quickest technique of SQL Injection exploitation. The basis of this method is that the valuable information of various DBMSs can be stored into the error messages in case of receiving an illegal SQL expression.

Double Blind SQL Injection: Double blind SQL Injection is a technique in which all error messages and vulnerable queries are excluded from the page returned by the web application and the request results do not influence the returned page.

Lateral Injection Attack: This is a technique that is used to compromise Oracle databases remotely. The attack exploits some common data types, including DATE and NUMBER, which do not take any input from the user and so are not normally considered to be exploitable. The database can be manipulated by an attacker just by using a bit of creative coding and/or lateral thinking.

Detection of SQL Injection Attacks

Knowing the characteristics of different types of SQLIA from the above definitions and sub-definitions, the Snort rules can be written accordingly. For example using regular expressions, to provide detection of SQLIAs by the NSM in target environment 401 and control environment 402, for alerting to the IDS. A more full explanation of the kinds of techniques utilised to use regular expressions to detect SQLIAs is found at http://www.symantec.com/connect/articles/detection-sql-injection-and-cross-site-scripting-attacks. This section identifies the regular-expression based rules for detecting these attacks.

For the purposes of this exemplar embodiment, it is important to detect each and every possible SQL Injection attack by identifying any occurrence of SQL meta-characters such as; single-quote, semi-colon or double-dash, etc. It is accepted that these signatures would result in a high number of false positives. Therefore an additional automated analysis is carried out on the alerts raised by the IDS rules.

Regular Expressions (ReqEx) for SQL Injection

The input validation logic should consider each and every type of input that originates from the user—be it form fields or cookie information—as suspect.

A trivial regular expression to detect SQL injection attacks is the SQL specific meta-characters such as the single-quote (') or the double-dash (--). In order to detect these characters and their hex equivalents, the following regular expression may be used:

/(\%27)|(\')|(\-\-)|(\%23)|(#)/ix

First detect either the hex equivalent of the single-quote, the single-quote itself or the presence of the double-dash. These are SQL characters for MS SQL Server and Oracle, which denote the beginning of a comment, and everything that follows is ignored. Additionally, if using MySQL, check for presence of the '#' or its hex-equivalent.

The above regular expression could be added into a new Snort rule as follows:

--- alert tcp $EXTERNAL_NET any -> $HTTP_SERVERS $HTTP_PORTS
(msg:"SQL Injection - Paranoid";
flow: to_server,established;uricontent:".php";pcre:"/(\%27)|(\')|(\-\-)|(\%23)|(#)/i"; classtype:Web-application-attack;
sid:9099; rev:5;)

---

In the case of the exemplary embodiment, the uricontent keyword has the value ".php", because the scripts are written in PHP.

In the previous regular expression, the double-dash is detected because there may be situations where SQL injection is possible even without the single-quote.

Modified RegEx for Detection of SQL Meta-Characters

This signature initially looks out for the =sign or its hex equivalent (%3D). It then allows for zero or more non-newline characters, and then it checks for the single-quote, the double-dash or the semi-colon.

/((\%3D)|(=))[^\n]*((\%27)|(\')|(\-\-)|(\%3B)|(;))/i

RegEx for Typical SQL Injection Attack

The majority of the CTF SQLIAs revolves around the use of the single quote to manipulate the original query so that it always results in a true value. Most of the examples use a format similar to 1'or'1'='1. It should be noted that this string can be easily evaded by supplying a value such as 1'or2>1--. Thus the only part that is constant in this is the initial alphanumeric value, followed by a single-quote, and then followed by the word 'or.' The Boolean logic that comes after this may be varied to an extent where a generic pattern is either very complex or does not cover all the variants. Thus these attacks can be detected to a fair degree of accuracy by using the next regular expression.

/\w*((\%27)|(\'))((\%6F)|o|(\%4F))((\%72)|r|(\%52))/ix—where:

\w*-zero or more alphanumeric or underscore characters (\%27)|(\')-the ubiquitous single-quote or its hex equivalent (\%6F)|o|(\%4F))((\%72)|r|(\%52)-the word 'or' with various combinations of its upper and lower case hex equivalents.

RegEx for Detecting SQL Injection with the UNION Keyword

The use of the 'Union' SQL query is also common in SQL Injection attacks against a variety of databases. If the earlier regular expression that just detects the single-quote or other SQL meta characters results in too many false positives, it can be further modified to specifically check for the single-quote and the keyword 'Union'. This can also be further extended to other SQL keywords such as 'select', 'insert', 'update', 'delete', etc.

/((\%27)|(\'))union/ix—where:

(\%27)|(\')—the single-quote and its hex equivalent union—the keyword Union

Similar expressions can be written for other SQL queries such as >select, insert, update, delete, drop, and so on.

RegEx for Detecting SQL Injection Attacks on a MS SQL Server

The attacker, if they have discovered that the Web application is vulnerable to SQL injection, will attempt to exploit it. The next step is to identify the backend database. If the back-end database is an MS SQL server, the attacker will try to execute one of the many dangerous stored and extended stored procedures. These procedures start with the letters 'sp' or 'xp' respectively. Primary focus would be to execute the 'xp_cmdshell' extended procedure, which allows the execution of Windows shell commands through the SQL Server. The access rights with which these commands will be executed are those of the account with which the SQL Server is running—usually Local System. Alternatively, the attacker may also try and modify the registry using procedures such as xp_regread, xp_regwrite, etc.

/exec(\s|\+)+(s|x)p\w+/ix—where exec—the keyword required to run the stored or extended procedure;

\s|\+)+—one or more whitespaces or their HTTP encoded equivalents;

(s|x)p—the letters 'sp' or 'xp' to identify stored or extended procedures respectively; and \w+—one or more alphanumeric or underscore characters to complete the name of the procedure.

Thus it can be seen that the Security Onion was used implemented as an NSM to detect SQLIAs in the target environment 401 and the in the control environment 402, and an IDS 411 to which the NSM provides alerts.

XenServer 3 virtual desktop is accessible from any workstation 406a . . . n to allow a system administrator to operate and access the Security Onion IDS 411 to monitor detected alerts. An example screenshot of the alerts is shown in FIG. 11. Also accessible through this interface is the analysis components of the feature extraction engine 412, prediction model generation engine 413, fuzzy rules generation engine 414, fuzzy inference engine 415 and data repository 416 and which the user can operate to generate a rule base from training data and use the CTP 410 to profile the risks of cyber threat detected in target environment 401. At training time and run time, the CTP 410 tool set is configured to operate in set sequences on the basis of received and logged alerts.

The analysis components and their operation at training time will now be described.

Detailed Example Embodiment—Captured Packet Retrieval and Feature Extraction Engine 412

In order to analyse the alerts for the purposes of rule base generation at training time or to profile the CT risk at runtime, the CTP tool set must first retrieve the packet data captured by an NSM/SIEM/other security infrastructure in the control environment 402 or target environment 401. The captured packet data can be stored by the Security Onion in data repository 416 in a PCAP format file. The contents of the PCAP files are taken from the SGuil component of the Security Onion tool set. The contents of the PCAP file are stored in the associated SGuil MySQL database in repository 416.

At training time, once a set of training data has been collected, the feature extraction engine 412 collects/retrieves the packet data associated with each alerted attack in the training set from the repository 416.

At run time, feature extraction engine 412 responds to a received alert in real time by collecting the captured packet data associated with the alert from the embodiment.

The captured packet data retrieved in the PCAP files is then analysed by the feature extraction engine 412 using an exemplar script highlighted in Appendix A. This script has dual a dual purpose. It is used to collect all SQLIAs detected in the one or more PCAP files. It is also used to pull out the latest packet that has caused the NSM solution to alert.

This script pulls out an example set of attributes from one or more packets identified in Table 1 below, which will ultimately help generate the predictive model for the attacks and also the fuzzy rule base.

TABLE 1

| Attribute No. | Attribute |
|---|---|
| 1. | Source IP address |
| 2. | Source Host Name |
| 3. | Source Host Port |
| 4. | Source Country |
| 5. | Destination IP address |
| 6. | Destination Country |
| 7. | Full URL of detected attack |
| 8. | Web Page URL that is attacked |

TABLE 1-continued

| Attribute No. | Attribute |
| --- | --- |
| 9. | What is the SQLi type of attack? |
| 10. | User Agent |
| 11. | OS Version |
| 12. | HTTP Response from associated packets |
| 13. | Frame number in PCAP packet |
| 14. | Occurrence of Source IP in attacks associated with PCAP file |
| 15. | Occurrence of Destination IP in attacks associated with PCAP file |
| 16. | Reason for the Alert |

The output of the script identified in Appendix A will also create a CSV file that is imported into the predictive model generation engine 413 component of the CTP 410. By setting the Snort rules to look for all basic SQLIA, as stated earlier, the IDS 411 will identify all the actual SQLIA and also many false positives. The CT risk indicators generated by the CTP 410 at run time should indicate the false positives as low risk, which can be given a low priority by a systems administrator or configured such that the alerting function does not register these events.

The output from the feature extraction engine 412 is stored in data repository 416 along with the actual raw data.

Detailed Example Embodiment—Prediction Model Generation Engine 413

In the example embodiment, for the prediction model generation engine, Weka, an open-source Java application produced by the University of Waikato in New Zealand, was used. The software bundle features an interface through which many classification-based prediction model generation algorithms (including decision trees) can be utilised on preformatted data sets. Using this tool set a number of SQLIA datasets were tested to gain insight on an algorithmically induced decision tree.

This provides the classification optimisation, which is fed into the definition and refinement of the fuzzy logic process.

The prediction model generation engine 413 in this detailed example accesses the data extracted by the feature extraction engine 412 relating to attacks detected in the CTF control environment 402 (and, to later improve the model, the control environment 401). However, to further increase the accuracy and roundedness of the prediction model, it would be advantageous to seek data input relating to 'test' attacks from a number of data sources to carry out the prediction model generation/classification process. For example, a number of other sources could be used to derive an adequate source of attacks ranging from Honeypot data, available SQL attack files, etc.

This section introduces the traditional Classification approaches and Associative Classification machine-learning techniques, including; association rule discovery and classification tasks in data mining.

The principle of classification in data mining is to develop a model consisting of a set of association rules derived from a labelled training data set. This classifies the new data objects, known as test data objects.

These association rules are deemed useful provided they are:
greater than 'min sup', i.e., the rules are frequent, and
confidence greater than 'min conf', i.e., the rules are strong.

Classification in data mining is a two-step process,
1) use a classification algorithm to learn the rules from a training data set; and
2) use the rules extracted in the first step to predict classes of test objects.

For this detailed example a derivative of the popular C4.5 Algorithm (published by Ross Quinlan in 1993) is used for generating a predictive model based on training data by a statistical classification technique. Specifically, the Weka J48 decision tree-inducing algorithm implementation of C4.5 decision tree algorithm that was used for the classification and prediction of the data.

J48 is a pruning decision tree where the fundamental step is to optimise the computational efficiency as well as classification accuracy of such a model. Applying pruning methods to the algorithm usually results in reducing the size of the tree (or the number of nodes) to avoid unnecessary complexity, and to avoid over-fitting of the data set when classifying new data. The nodes refer to decision points where the classification process of the data is carried out.

Post-pruning, the J48 algorithm evaluates the decision error (estimated percentage misclassifications) at each decision junction and propagates this error up the tree. At each junction, the algorithm compares:
Firstly the weighted error of each child node versus; and
Secondly the misclassification error.

If the child nodes were deleted then the decision node would be assigned the class label of the majority class. The training data misclassifications at each node would not provide a sufficient error estimate—the tree was created from this data so it would not lead to any pruning. Instead, the misclassification error would be understood as an approximation of the actual error based on incomplete data. This is where the statistical notion of confidence comes into play.

An alternative prediction model generation approach to decision trees and J45 is to use a Rule Induction and Covering Approach. Repeated Incremental Pruning to Produce Error Reduction algorithm (RIPPER) is another rule induction algorithm that has been developed by Cohen (Cohen, 1995). RIPPER builds the rules set into two sets,
a pruning set, and
a growing set.

RIPPER constructs the classifier using these two sets by repeatedly inserting rules starting from an empty rule set. The rule-growing algorithm starts with an empty rule, and heuristically adds one condition at a time until the rule has no error rate on the growing set.

RIPPER introduces a new stopping condition for generating rules which utilises a heuristic that stops adding rules using the minimum description length (MDL) principle (Rissanen, 1985). Where after a rule is inserted, the total description length of the rules set and the training data is estimated. If this description length is larger than the smallest MDL obtained so far, RIPPER stops adding rules.

The MDL assumes that the best model (set of rules) of data is the one that minimises the size of the model plus the amount of information required to identify the exceptions relative to the model (Witten and Frank, 2000).

The Heuristic aspect of SQLIA looks for specific techniques and patterns used by attackers. The heuristic technique for analysing these attacks examines the properties of the attacks and all its features and patterns to distinguish between legitimate, suspicious or actual SQL attacks. The SQLIA properties are typically derived and extracted from the SQL packets such as browser, IP source address, HTML tags and URL address.

The Data Mining component of this detailed example was conducted using the WEKA software system, which is an open Java source code for the data mining community that includes implementations of different methods for several different data mining tasks such as classification, association, and regression.

To begin the data mining, in the training phase, the attributes data extracted by features extraction engine 412 from the training set of PCAP files for attacks in the control environment 402 were imported into WEKA. FIG. 12 shows a sample of the extracted attributes in the WEKA interface. These attributes related to specific attacks will be used as the ultimate training data to provide a set of rules as a predictive model that are used to associate the above question set and provide the probability of the rules accuracy to derive the sophistication level.

The extracted attributes are preferably ones that have been identified to have an impact on the sophistication and capability used to classify an SQLIA. The attributes are split into three sections representing different characteristics.

If the prediction model generation engine 413 is to generate a prediction model using supervised learning, the attacks captured in the control environment 402 must be labelled, for example with a class relating to the expected effect on the security of the target environment 401. This can be enabled by the knowledge of the security weaknesses of the target environment 401, or by monitoring the response of the resources made available in control environment 402, which are designed to have vulnerabilities similar to the resources made available in target environment 401. For example, the attacks can be categorised as very low risk, low risk, medium risk, high risk and very high risk. If the prediction model generation engine is to perform unsupervised learning, then the knowledge of the expected response of the target environment 401 to attacks in the training data is used instead at the fuzzy rule generation engine to provide a rule antecedent.

When using the classification algorithms, the aim of the classifier is to use several feature variables as inputs to predict an output. In the case of SQLIA classification, a classifier rule tries to classify an attack as: basic, intermediate or sophisticated, by learning certain characteristics, features and patterns in the attack packets, particularly where the attack data is labelled in a supervised training process. In the following section, we briefly describe the classifiers used in the detailed example.

The practical part of this detailed example utilises two DM algorithms (J48 and Ripper explained above). The reason for using these algorithms is based on the different approaches they take in identifying learning rules from datasets.

The J48 algorithm in Weka, was selected because the C4.5 classifier provides an insight into which features are important in classifying a dataset, and it is known to work well for a wide range of classification problems.

The J48 implementation uses a divide-and-conquer approach, while the RIPPER algorithm uses a separate-and-conquer approach. The J48 algorithm resulted in an representation of a decision tree to classify the SQLIAs as: basic, intermediate or sophisticated.

The detailed example conducted a number of experiments, using the tenfold cross-validation approach (a default in Weka). In cross-validation, the training dataset is divided randomly into 10 blocks, each block is held out once, and the classifier is trained on the remaining 9 blocks; then its error rate is evaluated on the holdout block. Thus, the learning procedure is executed ten times on variant training datasets.

Detailed Example Embodiment—Fuzzy Rules Generation Engine 414 and Fuzzy Inference Engine 415

Fuzzy logic is used to characterize the SQLIA attributes as a fuzzy variable, which is used in the exemplary system to determine the capability and/or sophistication of the SQLIA.

The fuzzy rules generation engine 414 uses the prediction model output generated by the prediction model generation engine 413 and develops a fuzzy logic rule-set derived from the supervised machine learning approach and data mining associative classification techniques.

This detailed example automates the fuzzy rules production by using the extracted classification rules, which are produced by using associative classification algorithms and techniques. These fuzzy rules allow us to construct linguistic 'if-then' rules that reflect the relationships between the different SQLIA characteristics and features and their association with one another for the SQLIA assessment.

Based on the current collection of PCAP SQLIA attribute classifications and patterns from the dataset defined in the previous section, the detailed example encapsulates the results of the associative classification model and attempts to use these properties to distinguish between basic, intermediate and sophisticated SQLIA attacks.

As stated, to create the fuzzy model, rules generated by predictive model generation engine 413 were utilised and inserted into the fuzzy inference engine 415 for the final SQLIA analysis engine. The fuzzy inference engine 415 is based on the Mamdani inference mechanism since it is most suited to the CTP model architecture.

Attributes are represented by names (or labels) that will be used as linguistic variables in the Fuzzy Rules generated by fuzzy rule generation engine 414 and used by the Fuzzy Inference Engine 415. Classifier rules generated from classification algorithms such as J45 can also be used as fuzzy rules.

Each fuzzy rule generated by the fuzzy rule generation engine 414 has, as an antecedent, a fuzzy set of one or more input fuzzy variables each representative of a said attribute and any logical operators connecting input fuzzy variables. Each fuzzy rule also has, as a consequent, a fuzzy set of an output fuzzy variable representative of the CT risk indicator.

The fuzzy rule generation engine 414 generates a set of fuzzy rules based on analysing the predictive model to identify a fuzzy rule antecedent using one or more linguistic attribute values indicative of a cluster of training set cyber threats and an associated consequent output fuzzy variable value indicative of the CT risk posed by the cluster of training set cyber threats to the target environment. The information regarding the CT risk posed by the cluster of training set cyber threats to the target environment can be fed in at the prediction model generation stage, for example, by way of supervised learning, or at the fuzzy rule generation stage, for example, once a cluster of attacks has been identified and a rule antecedent generated. The CT risk posed by the cluster of training set cyber threats to the target environment may be assessed by monitoring what the effect of those cyber threats would be on the target environment, in view of the security vulnerabilities thereof.

The predictive model and the assessed CT risk posed by the cluster of training set cyber threats to the target environment are used to generate membership functions for the fuzzy sets of the input and/or output fuzzy variables and/or to generate crisp value conversion functions for non-numeric input attribute values.

Once the fuzzy rule bases have been generated by fuzzy rule generation engine 414 using the training data from control environment 402, the CTP 410 is now usable at run time in the target environment to profile cyber threats alerted to IDS 411 in real time.

In the example embodiment, the Xfuzzy3 open source tool is employed to compute the configuration parameters that regulate the operation of the fuzzy inference engine 415 for the final production of the SQLIA capability rating.

Results of the SQLIA risk rate are usually qualified with a statement of uncertainties. The CTP tool set presents an approach to overcome the 'fuzziness' of a SQLIA by using fuzzy logic.

At runtime, on receipt of an alert of an SQLIA at NMS 411, the feature extraction engine 412 extracts attribute values for the attack from captured packet data. The fuzzy inference engine 415 then, for each fuzzy rule of a rule base and for each input fuzzy variable of the rule antecedent, fuzzifies data pertaining to the attribute represented by the input fuzzy variable to determine a membership value across the fuzzy set of the input fuzzy variable. In order to fuzzify the attribute value to a membership value across a fuzzy set in the universe of discourse, the fuzzy inference engine 415 may first convert the threat attribute to a crisp value in the universe of discourse and applying the membership function for the relevant fuzzy set.

Next, the fuzzy inference engine 415 evaluates the antecedent, performing any declared fuzzy logical operators to provide a single membership value.

Finally, the fuzzy inference engine 415 evaluates the consequent by performing a fuzzy implication operator on the antecedent to determine the membership value of the relevant output cyber threat indicator.

Once the membership values of the various relevant output cyber threat indicators have been calculated across a rule base, the fuzzy inference engine 415 may aggregate the membership values output by each rule to produce a combined membership value for the CT risk indicator output by the rule base.

Where plural rule bases are provided that output different CT risk indicators (such as when groups of related attributes are combined in each rule base), a compound CT risk indicator output fuzzy variable may be evaluated by the fuzzy inference engine 415 by combining membership values for the CT risk indicators output by plural rule bases using a further rule base to produce a membership value for a compound output CT risk indicator.

Finally, for any CT risk indicator produced by the fuzzy inference engine 415, the membership values for each CT risk indicator output are defuzzified to provide a crisp CT risk indicator value.

Thus the fuzzy inference engine 415 reasons across the rule base for the attributes of an attack received in real time to intelligently calculate SQLIA risk probability using a fuzzy logic approach over an expert rule base intelligently generated from pertinent training data. SQLIA risk rate detection is an "assessment" of something hypothetical, defined as "SQLIA risk". In a simple model, this may be interpreted as either a basic, intermediate or sophisticated attack.

Figure 13:
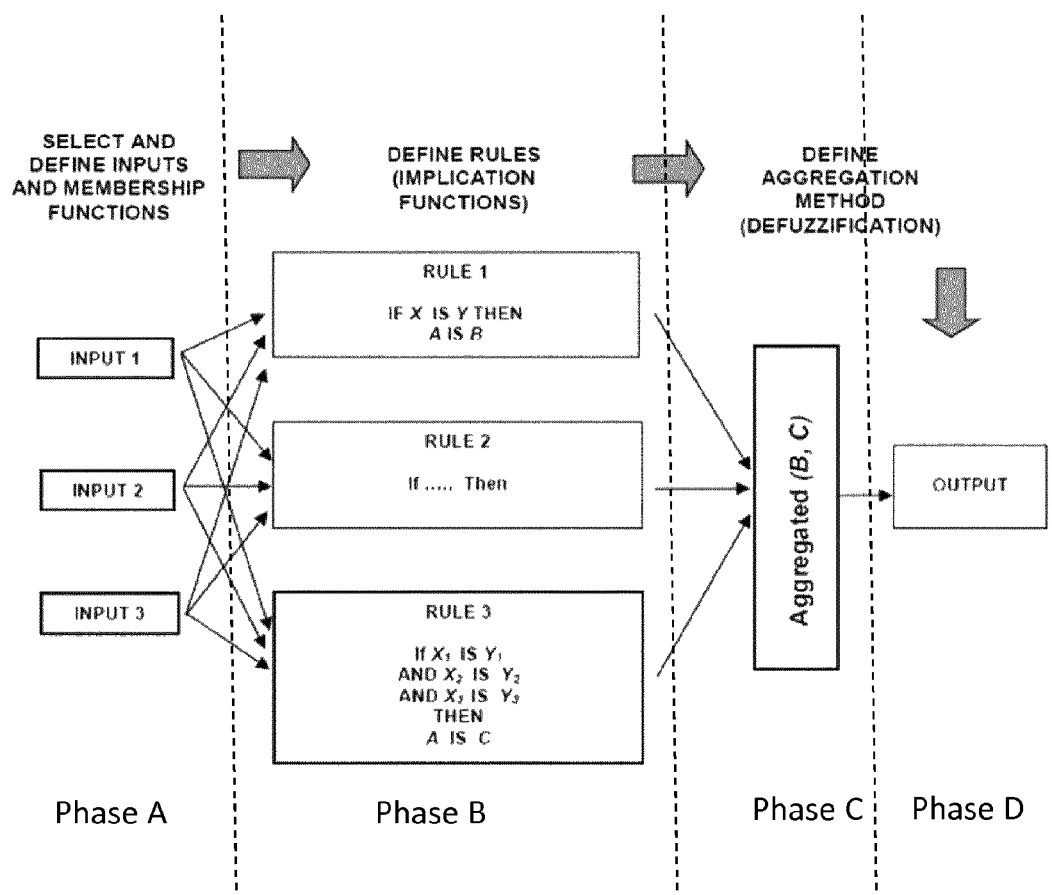
FIG. 13 shows the four phases of the process carried out by the fuzzy inference engine.

Thus the Fuzzy inference engine 415 involves the fuzzification of input variables that is based on the SQLIA characteristics (attributes that have been extracted through the data-mining process), the aggregation of the rule outputs, and the defuzzification technique. Specifically, the fuzzy inference engine 415 performs of four phases illustrated in FIG. 13, which will now be described in turn.

Phase A—Fuzzification

In the first phase, the membership functions of the fuzzy sets of the input fuzzy variables must be selected and evaluated using a fuzzification process. Fuzzification is the process of generating membership values for a fuzzy variable using membership functions. The first step is to take the crisp inputs from the attributes that identify the SQLIA components and determine the degree to which these inputs belong to each appropriate fuzzy set.

This crisp input is always a numeric value limited to the universe of discourse, i.e. the total set of values that could classify that attribute. Once the crisp inputs are obtained, they are fuzzified against the appropriate linguistic fuzzy sets. The fuzzy detection model provides more thorough definitions for each factor and its interactions with other factors. This approach will provide a decision tool for identifying SQLIAs.

The essential advantage offered by fuzzy logic techniques is the use of linguistic variables to represent key SQLIA characteristic indicators and the relation of SQLIA probability. In this step, linguistic descriptors such as High, Low, and Medium are assigned to a range of values for each key SQLIA characteristic indicator. Since these descriptors will form the basis for capturing expert inputs based on the impact of Key SQLIA Characteristic Indicators within the PCAP file, it is important to calibrate them to how they are commonly interpreted by the experts providing input.

The valid ranges of inputs are considered and divided into classes, or fuzzy sets. For example, the probability of reliability that the Source IP address is coming from a determined attacker can range from 'low' to 'high' with other values in between.

It is not possible to specify clear boundaries between classes. The degree of belongingness of the values of variables to any selected class is called the degree of membership; a membership function is designed for each SQLIA characteristic indicator, which is a curve that defines how each point in the input space is mapped to a membership value (or degree of membership) between [0, 1].

Figure 14:
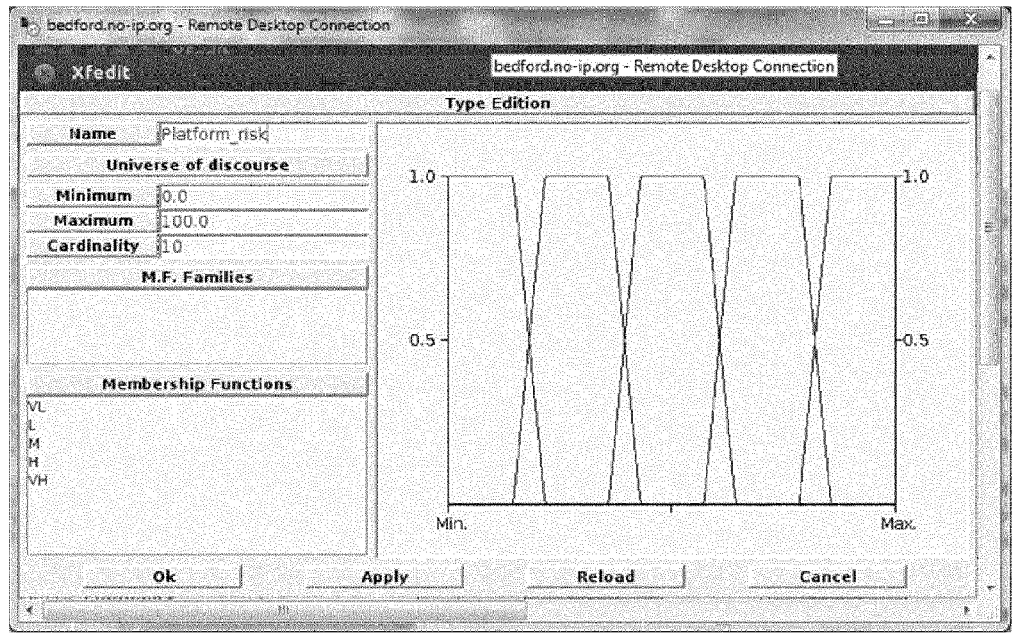
FIG. 14 illustrates the membership values of the fuzzy sets of an output fuzzy variable 'Platform Risk'.

Linguistic values are assigned to each SQLIA indicator for example as Low, Moderate and High and for example the SQLIA risk rate as basic, intermediate or sophisticated (triangular and trapezoidal membership function). For each input the values can range for example from 0 to 10 while, for output, they range for example from 0 to 100. An exemplar of the membership values of the fuzzy sets of an output fuzzy variable 'Platform Risk' is shown in FIG. 14. The x-axis in the FIG. 14 plot represents the range of possible values for the corresponding CT risk example indicator (Very Low, Low, Moderate, High and Very High). The y-axis represents the degree to which values for the Platform risk indicators as they are represented by the fuzzy sets of the linguistic descriptor.

The same approach is used to calibrate all the other key SQLIA characteristic indicators. The ranges of their fuzzy variables are derived and tuned from a series of SQLIA experiments with case-studies, surveys and expert knowledge.

In order to fuzzify the attribute value to a membership value across a fuzzy set in the universe of discourse, the fuzzy inference engine 415 may first convert the threat attribute to a crisp value in the universe of discourse and applying the membership function for the relevant fuzzy set.

Phase B—Fuzzy Rule Evaluation

The second step is where the fuzzified inputs are applied to the antecedents of the fuzzy rules. Since the fuzzy rule has multiple antecedents, the fuzzy operator (AND or OR) is used to obtain a single number that represents the result of the antecedent evaluation. The AND fuzzy operation (intersection) is applied to evaluate the conjunction of the rule antecedents.

Having specified the risk associated with the SQLIA and its key SQL characteristic indicators, the next logical step is to specify how SQLIA probability varies as a function of the Key SQLIA Characteristic Indicators. The fuzzy rule generation engine 414 provides fuzzy rules in the form of if . . . then statements that relate SQLIA probability to various levels of key SQLIA characteristic indicators based on expert knowledge and experience.

Fuzzy rule evaluation is conducted by evaluating the antecedent, performing any declared fuzzy logical operators to provide a single membership value and evaluating the consequent by performing a fuzzy implication operator on the antecedent, determines the membership value of the relevant output cyber threat indicator.

Phase C—Aggregation of the Rule Outputs

This is the process of unification of the outputs of all the rules. It is the combination of the membership functions of all the rules' consequents previously scaled into single fuzzy sets (output). Thus, input of the aggregation process is the list of scaled consequent membership functions, and the output is one fuzzy set for each output variable.

Phase D—Defuzzification

This is the last step in the fuzzy inference process, where a fuzzy output of a fuzzy inference system is transformed into a crisp output. Fuzziness helps to evaluate the rules, but the final output of this system has to be a crisp number. The input for the defuzzification process is the aggregate output fuzzy set and the output is a number. This step was done using the Centroid technique because it is the most commonly-used method of defuzzification.

Detailed Example Embodiment—Example Operation

The CTP 410 tool set utilises a number of discrete process that examine directly or indirectly the PCAP files associated with the SQLIA. The types of mathematical analysis carried out are defined in the previous section.

Figure 15:
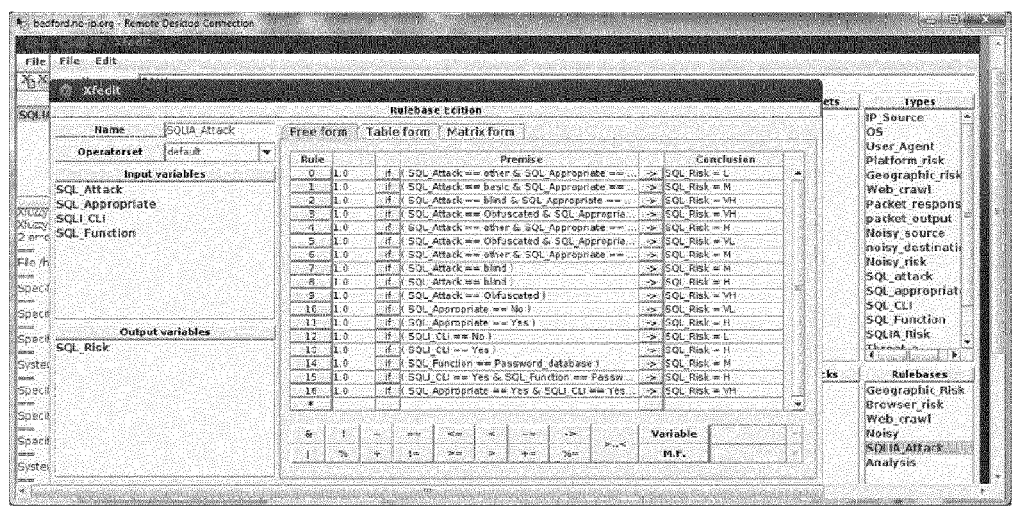
FIG. 15 shows the rules of the 'SQL_Risk' rule base.

The feature extraction and predictive model generation process identified a number of attributes that could be grouped into a cluster of associated configurations. These clusters then form the basis fuzzy rule generation process to generate rules for use in the fuzzy inference process. As can be seen from FIG. 15, which shows the rule set for 'SQL_Risk' rule set which examines the actual SQLIA detected to identify the CT risk to the target environment 410 taking into account the features concerning the SQL attack profile alone. In this regard, the J48 algorithm has identified SQL_Attack, SQL_Appropriate, SQL_CLI and SQL_Function packet attributes as a set of related attributes that give a dominant effect in clustering of certain attacks (e.g. by attack type). These attributes were used as a specific set of inputs into what the fuzzy rule generation engine 412 has generated as the 'SQL_Risk' rule set. As can be seen from FIG. 15, each rule takes one or more input fuzzy variables joined by a fuzzy operator (AND/OR), and provides as a consequent an SQL risk rating (VL: Very Low; L: Low; M: Medium; H: High; and VH: Very High).

Five other rule bases were generated by fuzzy rules generation engine 412 from the predictive model, including a 'Geographic_Risk' rule base, a 'Platform_Risk' rule base; a 'Packet_Risk' rule base, and a 'Noisy_Risk' rule base.

At run time, a received alert prompts feature extraction engine 412 to extract attribute data from the packet data related to the attack, and the fuzzy inference engine fuzzifies the attribute values into membership values of the fuzzy sets of the various input fuzzy variables of the rule bases. The rules of each rule base are then aggregated to give an aggregated output fuzzy variable for each rule base.

At this stage it would be possible to defuzzify the rule base outputs to arrive at crisp values for the different indicators.

Figure 16:
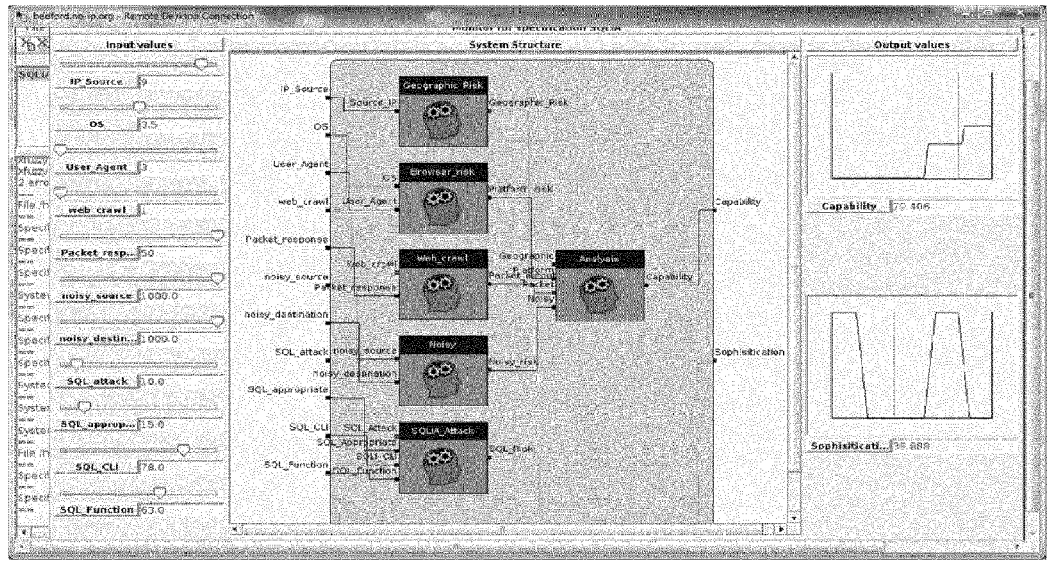
FIG. 16 shows the fuzzy inference model carried out by fuzzy inference engine to evaluate attack capability and sophistication.
Figure 17:
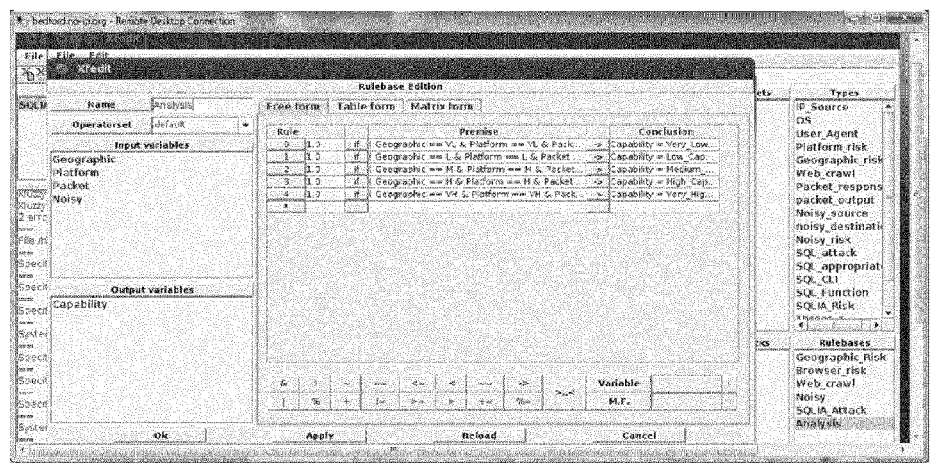
FIG. 17 shows the aggregation rule base used to evaluate the capability risk of the attacker.

However, in the exemplary embodiment, as shown in FIG. 16 which illustrates the fuzzy inference model, each output of the evaluation of four of the rule bases were combined using a further aggregation rule base, illustrated in FIG. 17. Specifically, the 'Geographic_Risk' rule base, a 'Platform_Risk' rule base; a 'Packet_Risk' rule base, and a 'Noisy_Risk' rule base were each, due to the nature of the attributes used to evaluate the risk measures, considered to be representative of the capability of an attacker to mount a viable cyber attack. Thus the fuzzy inference engine 415 was used to evaluate the fuzzy rules of the aggregation rule base to combine the membership values of the 'Geographic_Risk', 'Platform_Risk', 'Packet_Risk', and 'Noisy_Risk' fuzzy outputs for the detected attack, to produce a Capability_Risk fuzzy output. The SQL_Risk fuzzy output of the 'SQL_Risk' rule base was, however, taken to be representative of the sophistication of the detected attack.

After the Capability_Risk and SQL_Risk fuzzy output variables have been evaluated, the membership values are defuzzified to calculate the sophistication and capability of the detected alert.

The SQLIA attributes displayed in screen shot of FIG. 16 demonstrate that the sophistication of the detected SQLIA attack in question is approximately 39% which maps back to a linguistic value of 'Low'.

However, the capability of the attacker based on the various attributes including geographic location, the operating system and browser in use demonstrate that the capability of this attacker is 79% which maps to a linguistic value of 'High'.

The result of this alert informs the security consultant or the Security Operations Centre (SOC) that this is an attack and not a false positive. Although this attack is from a capable attacker, the actual attack is not sophisticated. Therefore the attacker could compromise the web site and associated backend database, but it would require a fairly persistent and continuous set of attacks to achieve the compromise. It should be easy to prevent the attacks from progressing before any sensitive data has been compromised.

As a result of this particular attack and associated attacks being detected and alerted on, the CTP could create an automated block (deny rule) using a standard firewall to block the originating source of the attack.

In this example, the capability and sophistication of the alert clearly confirms that the site is under attack and that the systems administrator/security team should raise their vigilance stakes, but it does not need to initiate a forensic investigation into determining if the web site and back end database has been compromised. The lack of sophistication would enable the systems administrator/security team to easily identify through the various PCAP files if any sensitive data has egressed the database server.

Thus as a result of the CT risk level indications provided by CTP 410 of the present invention, the systems administrator/security team is enabled to immediately see an assessment of the risk posed by an alerted attack, enabling them to handle them promptly and appropriately, and to more effectively defend the target environment 401 against cyber attacks. Automating a response to ignore or activate remedial actions against identified threats thus alleviating data deluge.

Appendix A—Script for Use in Feature Extraction Engine 412 in Detailed Example Embodiment This is the script that is used to analyse the PCAP files and obtain the required attributes to for the data mining and IDS alert analysis. This script is an extensively modified version of the sqlinjecct-finder.py python code located at https://code.google.com/p/sqlinject-finder/.

The invention claimed is:

1. A computer implemented method of profiling cyber threats detected in a target environment, comprising:
   receiving, from a Security Information and Event Manager (SIEM) monitoring the target environment, alerts triggered by a detected potential cyber threat, and, for each alert:
     retrieving, by at least one computer processor, captured packet data related to the alert;
     extracting, by the at least one computer processor, data pertaining to a set of attributes from captured packet data triggering the alert;
     applying, by the at least one computer processor, fuzzy logic to data pertaining to one or more of the attributes to determine values for one or more output variables indicative of a level of an aspect of risk attributable to the cyber threat;
   wherein the fuzzy logic comprises one or more rule bases comprising fuzzy rules and being usable to evaluate a CT risk indicator, and
   wherein each fuzzy rule of a rule base has:
     as an antecedent, a fuzzy set of one or more input fuzzy variables each representative of a said attribute and any logical operators connecting input fuzzy variables, and
     as a consequent, a fuzzy set of an output fuzzy variable representative of the CT risk indicator.

2. A method as claimed in claim 1, further comprising ranking the received alerts in priority based on the respective CT risks they represent.

3. A method as claimed in claim 1, wherein said method is performed in real-time to facilitate administrators in identifying high-risk cyber threats.

4. A method as claimed in claim 1, wherein the alerts are triggered by a network security monitor indicating a potential SQL injection attack.

5. A method as claimed in claim 1, wherein the detected cyber threats are one or more threats selected from the group comprising: SQL injection attacks; OS command injection attacks; buffer overflow attacks; XSS attacks; phishing attacks, or any other malicious attack category.

6. A method as claimed in claim 1, wherein the fuzzy logic is configured to provide one or more output variables that are indicative of a level of the following aspects of risk attributable to the cyber threat: threat sophistication risk; threat capability risk; confidentiality risk; system integrity risk; and system availability risk.

7. A method of automatically generating one or more rule bases for an expert system usable to profile cyber threats detected in a target environment, comprising the steps of:
   for each alert of a training set of alerts triggered by a potential cyber threat detected by an SIEM:
     retrieving, by at least one computer processor, captured packet data related to the alert; and
     extracting, by the at least one computer processor, training threat data pertaining to a set of attributes from captured packet data triggering the alert;
   generating, by the at least one computer processor, a predictive model of the level of risk posed by an alert based on attribute values for that alert by analysing the captured training threat data pertaining to the set of attributes; and
   generating, by the at least one computer processor, a set of fuzzy rules based on the predictive model, said rules being usable at run time in a fuzzy logic engine to evaluate data pertaining to one or more of the extracted attributes of a detected cyber threat to determine values for one or more output variables indicative of a level of an aspect of risk attributable to the detected cyber threat;
   wherein the fuzzy logic comprises one or more rule bases comprising fuzzy rules and being usable to evaluate a CT risk indicator, and
   wherein each fuzzy rule of a rule base has:
     as an antecedent, a fuzzy set of one or more input fuzzy variables each representative of a said attribute and any logical operators connecting input fuzzy variables, and
     as a consequent, a fuzzy set of an output fuzzy variable representative of the CT risk indicator.

8. Computing apparatus for profiling cyber threats detected in a target environment, comprising:
   one or more processors; and
   computer readable medium comprising instructions which when executed, cause the computing apparatus to be operable to carry out the method comprising:
     receiving, from a Security Information and Event Manager (SIEM) monitoring the target environment, alerts triggered by a detected potential cyber threat, and, for each alert:
       retrieving by a processor captured packet data related to the alert;
       extracting by said processor data pertaining to a set of attributes from captured packet data triggering the alert; and
       applying fuzzy logic to data pertaining to one or more of the attributes to determine values for one or more output variables indicative of a level of an aspect of risk attributable to the cyber threat;
   wherein the fuzzy logic comprises one or more rule bases comprising fuzzy rules and being usable to evaluate a CT risk indicator, and
   wherein each fuzzy rule of a rule base has:
     as an antecedent, a fuzzy set of one or more input fuzzy variables each representative of a said attribute and any logical operators connecting input fuzzy variables, and
     as a consequent, a fuzzy set of an output fuzzy variable representative of the CT risk indicator.

9. A non-transitory computer readable medium comprising instructions which when executed, cause computing apparatus having one or more processors to be operable to carry out the method comprising:

receiving, from a Security Information and Event Manager (SIEM) monitoring the target environment, alerts triggered by a detected potential cyber threat, and, for each alert:
  retrieving by a processor captured packet data related to the alert;
  extracting by said processor data pertaining to a set of attributes from captured packet data triggering the alert; and
  applying fuzzy logic to data pertaining to one or more of the attributes to determine values for one or more output variables indicative of a level of an aspect of risk attributable to the cyber threat;
wherein the fuzzy logic comprises one or more rule bases comprising fuzzy rules and being usable to evaluate a CT risk indicator, and
wherein each fuzzy rule of a rule base has:
as an antecedent, a fuzzy set of one or more input fuzzy variables each representative of a said attribute and any logical operators connecting input fuzzy variables, and
as a consequent, a fuzzy set of an output fuzzy variable representative of the CT risk indicator.

\* \* \* \* \*